(12) United States Patent
Hu et al.

(10) Patent No.: US 12,414,108 B2
(45) Date of Patent: Sep. 9, 2025

(54) DATA TRANSMISSION METHOD AND DEVICE, USER EQUIPMENT, BASE STATION, COMMUNICATION SYSTEM AND STORAGE MEDIUM

(71) Applicant: ZTE Corporation, Guangdong (CN)

(72) Inventors: Yuzhou Hu, Shenzhen (CN); Zhifeng Yuan, Shenzhen (CN); Li Tian, Shenzhen (CN); Junfeng Zhang, Shenzhen (CN); Jianqiang Dai, Shenzhen (CN); Weimin Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 377 days.

(21) Appl. No.: 17/472,283

(22) Filed: Sep. 10, 2021

(65) Prior Publication Data

US 2022/0104226 A1    Mar. 31, 2022

Related U.S. Application Data

(63) Continuation of application No. PCT/CN2020/078802, filed on Mar. 11, 2020.

(30) Foreign Application Priority Data

Mar. 13, 2019   (CN) .......................... 201910190286.7

(51) Int. Cl.
*H04W 72/12*    (2023.01)
*H04W 72/1268*  (2023.01)
(Continued)

(52) U.S. Cl.
CPC ....... *H04W 72/1268* (2013.01); *H04W 72/23* (2023.01); *H04W 74/0833* (2013.01)

(58) Field of Classification Search
CPC ......... H04W 72/1268; H04W 74/0833; H04W 72/1289
See application file for complete search history.

(56) References Cited

U.S. PATENT DOCUMENTS

2015/0289292 A1   10/2015   Sun et al.
2016/0150570 A1   5/2016   Wang et al.
(Continued)

FOREIGN PATENT DOCUMENTS

CN    105848165 A    8/2016
CN    105979594 A    9/2016
(Continued)

OTHER PUBLICATIONS

Examination Report for corresponding Indian application No. 202117040882 dated Feb. 16, 2023. 7p, in Indian and English languages.
(Continued)

*Primary Examiner* — Muthuswamy G Manoharan
(74) *Attorney, Agent, or Firm* — Crowell & Moring LLP

(57) ABSTRACT

Provided are a data transmission method and apparatus, a user equipment, a base station, a communication system and a storage medium. The method includes abiding by a mapping relationship between the resource configuration of a physical uplink shared channel (PUSCH) resource and preamble sequence configuration information according to the resource configuration of the PUSCH resource and determining preamble sequence configuration information corresponding to the resource configuration of the PUSCH resource; mapping a preamble sequence onto a physical random access channel (PRACH) resource according to the preamble sequence configuration information; and sending a message containing the PRACH resource and the PUSCH resource.

12 Claims, 6 Drawing Sheets

(51) Int. Cl.
*H04W 72/23* (2023.01)
*H04W 74/08* (2024.01)
*H04W 74/0833* (2024.01)

(56) References Cited

U.S. PATENT DOCUMENTS

| | | | |
|---|---|---|---|
| 2016/0366704 | A1 | 12/2016 | Lee et al. |
| 2017/0231012 | A1* | 8/2017 | Sung ................ H04L 1/004 |
| 2017/0273056 | A1 | 9/2017 | Papasakellariou |
| 2018/0098359 | A1 | 4/2018 | Patel et al. |
| 2021/0345422 | A1* | 11/2021 | Chen ................ H04W 72/044 |
| 2022/0132594 | A1* | 4/2022 | Ren ................ H04L 5/0051 |

FOREIGN PATENT DOCUMENTS

| | | |
|---|---|---|
| CN | 106465401 A | 2/2017 |
| CN | 107371126 A | 11/2017 |
| CN | 110536418 A | 12/2019 |
| EP | 3 923 652 A1 | 12/2021 |
| EP | 3 927 063 A1 | 12/2021 |
| KR | 20090075441 A | 7/2009 |
| WO | WO 2014/166046 A1 | 10/2014 |
| WO | WO 2016/112721 A1 | 7/2016 |
| WO | WO 2020/150546 A1 | 7/2020 |
| WO | WO 2020/182152 A1 | 9/2020 |

OTHER PUBLICATIONS

International Search Report for priority application No. PCT/CN2020/078802 dated May 26, 2020, 4p, in English and Chinese languages.
Written Opinion of the International Searching Authority for priority application No. PCT/CN2020/078802 dated May 26, 2020, 4p, in Chinese language.
English language translation of the International Search Report for priority application No. PCT/CN2020/078802 dated May 26, 2020, 2p.
Concise Explanation of Relevance of Written Opinion of the International Searching Authority (A10), 1p.
Communication pursuant to Article 94(3) EPC for corresponding European Patent No. 20769058.7 dated Dec. 12, 2023, indicating application does not meet requirements, 6p.
Korean-language Office Action issued in Korean Application No. 10-2021-7029458 dated Feb. 10, 2025 with English summary (11 pages).
ZTE; "Summary of 7.2.1.1 Channel Structure for Two-step RACH"; 3GPP TSG RAN WG1 #96; R1-1903435; Athens, Greece, Feb. 25-Mar. 1, 2019; 28 pages.
First Office Action issued on Nov. 13, 2024 for Chinese Patent Application No. 202210337205.3; 15 pages (including English translation).
Extended European Search Report for application No. EP 20769058.7 dated Sep. 28, 2022, 12p.
Nokia et al. "On 2-step RACH Channel Structure", 3GPP TSG RAN WG1 Meeting #96, R1-1902135, Mar. 1, 2019, 8p, GR.
ZTE et al., "Considerations on the channel structure of msgA", 3GPP TSG RAN WG1 Meeting #96, R1-1901626, Mar. 1, 2019, 5p, GR.
Qualcomm Incorporated, "Report of Email Discussion [103#55] [NR-U] 2-step RACH Model and Initial Information Contents (Qualcomm)", 3GPP TSG-RAN WG2 Meeting #103bis, R2-1815564, Oct. 12, 2018, 17p, CN.

\* cited by examiner

DATA TRANSMISSION METHOD AND DEVICE, USER EQUIPMENT, BASE STATION, COMMUNICATION SYSTEM AND STORAGE MEDIUM

This application is a continuation of International Application No. PCT/CN2020/078802, filed Mar. 11, 2020, which claims priority to Chinese Patent Application No. 201910190286.7, filed Mar. 13, 2019, the entireties of both of which are hereby incorporated by reference.

TECHNICAL FIELD

The present application relates to the field of communications, for example, a data transmission method and apparatus, a user equipment, a base station, a communication system and a storage medium.

BACKGROUND

During 2-step random access channel (RACH) or data transmission from UE in inactive/idle state, a random access message A (msgA) or a data packet message is transmitted in a physical random access channel (PRACH) resource and/or a physical uplink shared channel (PUSCH) resource. A user equipment (UE) maps a preamble sequence onto the PRACH resource according to certain preamble sequence configuration information. The PUSCH resource carries at least a UE identification (ID). The value of the size of this ID information may be 56 bits, 72 bits, 144 bits 208 bits or the like. Depending on different states e.g. RRC states of the UE and different trigger events, the payload size of the preceding message may be greater than 208 bits. Different payload sizes may correspond to resource configurations of different PUSCH resources. In the related art, the UE cannot select preamble sequence configuration information corresponding to the resource configuration of the PUSCH resource of the UE and thus cannot map a preamble sequence according to the preamble sequence configuration information.

SUMMARY

To solve at least one of the preceding technical problems, embodiments of the present application provide a solution hereinafter.

Embodiments of the present application provide a data transmission method. The method includes: abiding by a mapping relationship between the resource configuration of a PUSCH resource and preamble sequence configuration information according to the resource configuration of the PUSCH resource and determining preamble sequence configuration information corresponding to the resource configuration of the PUSCH resource; mapping a preamble sequence onto a PRACH resource according to the preamble sequence configuration information; and sending a message containing the PRACH resource and the PUSCH resource.

Embodiments of the present application provide a data transmission method. The method includes receiving a message containing a PRACH resource and a PUSCH resource; acquiring the preamble sequence configuration information of the PRACH resource in the message; abiding by a prestored mapping relationship between the resource configuration of the PUSCH resource and the preamble sequence configuration information according to the preamble sequence configuration information and determining the resource configuration mode of the PUSCH resource corresponding to the preamble sequence configuration information; and acquiring information in the PUSCH resource according to the resource configuration mode.

Embodiments of the present application provide a data transmission apparatus. The apparatus includes a first search module configured to abide by a mapping relationship between the resource configuration of a PUSCH resource and preamble sequence configuration information according to the resource configuration of the PUSCH resource and determine preamble sequence configuration information corresponding to the resource configuration of the PUSCH resource; a mapping module configured to map a preamble sequence onto a PRACH resource according to the preamble sequence configuration information; and a first sending module configured to send a message containing the PRACH resource and the PUSCH resource.

Embodiments of the present application provide a data transmission apparatus. The apparatus includes a second receiving module configured to receive a message containing a PRACH resource and a PUSCH resource; a first acquisition module configured to acquire the preamble sequence configuration information of the PRACH resource in the message; a second search module configured to abide by a prestored mapping relationship between the resource configuration of the PUSCH resource and the preamble sequence configuration information according to the preamble sequence configuration information and determine the resource configuration mode of the PUSCH resource corresponding to the preamble sequence configuration information; and a second acquisition module configured to acquire information in the PUSCH resource according to the resource configuration mode.

Embodiments of the present application provide a UE for data transmission. The UE includes one or more processors and a memory.

The memory is configured to store one or more programs.

When executed by the one or more processors, the one or more programs cause the one or more processors to perform any implementation of the preceding first data transmission method.

Embodiments of the present application provide a base station for data transmission. The base station includes one or more processors and a memory.

The memory is configured to store one or more programs.

When executed by the one or more processors, the one or more programs cause the one or more processors to perform any implementation of the preceding second data transmission method.

Embodiments of the present application provide a communication system. The system includes the UE and the base station of embodiments of the present application.

Embodiments of the present application provide a storage medium. The storage medium stores a computer program. When executed by a processor the computer program causes the processor to perform any method of embodiments of the present application.

In the data transmission method of embodiments of the present application, before the message is sent, the corresponding preamble sequence configuration information may be selected according to the resource configuration of the PUSCH resource, and the preamble sequence is mapped onto the PRACH resource by using the preamble sequence configuration information. In this manner, it facilitates the UE to select the transmission resource according to the resource configuration of the PUSCH resource. Further, it is easier for the base station to receive the message.

DETAILED DESCRIPTION

Embodiments of the present application are described hereinafter in detail with reference to the drawings. It is to be noted that if not in conflict, the embodiments described herein and the features thereof may be combined with each other.

The 5th-generation New Radio in unlicensed spectrum (5G NR-U) introduces a new resource mapping mode to PRACH. That is, a preamble sequence is mapped onto PRACH in an interlace manner. Table 1 describes possible combinations of a number (denoted by M in Table 1) of different interlace blocks and a number (denoted by N in Table 1) of resource blocks (RBs) of each interlace block in the case of a transmit bandwidth of 20 MHz and different subcarrier spacings (SCSs).

TABLE 1

| SCS | M (Number of Interlace Blocks) | N (Number of Resource Blocks per Interlace Block) |
| --- | --- | --- |
| 15 kHz | 12 | 8 or 9 |
|  | 10 | 10 or 11 |
|  | 8 | 13 or 14 |
| 30 kHz | 6 | 8 or 9 |
|  | 5 | 10 or 11 |
|  | 4 | 12 or 13 |
| 60 kHz | 4 | 6 |
|  | 3 | 8 |
|  | 2 | 12 |
| 60 kHz (in the case when 26 physical resource blocks are supported at a bandwidth of 20 MHz) | 4 | 6 or 7 |
|  | 2 | 13 |
|  | 3 | 8 or 9 |

PRACH interlace mapping modes include, but are not limited to, uniform physical resource block level (Uniform PRB-level) interlace mapping, non-uniform PRB-level interlace mapping, uniform resource element (RE) level interlace mapping, and contiguous mapping.

Figure 1:
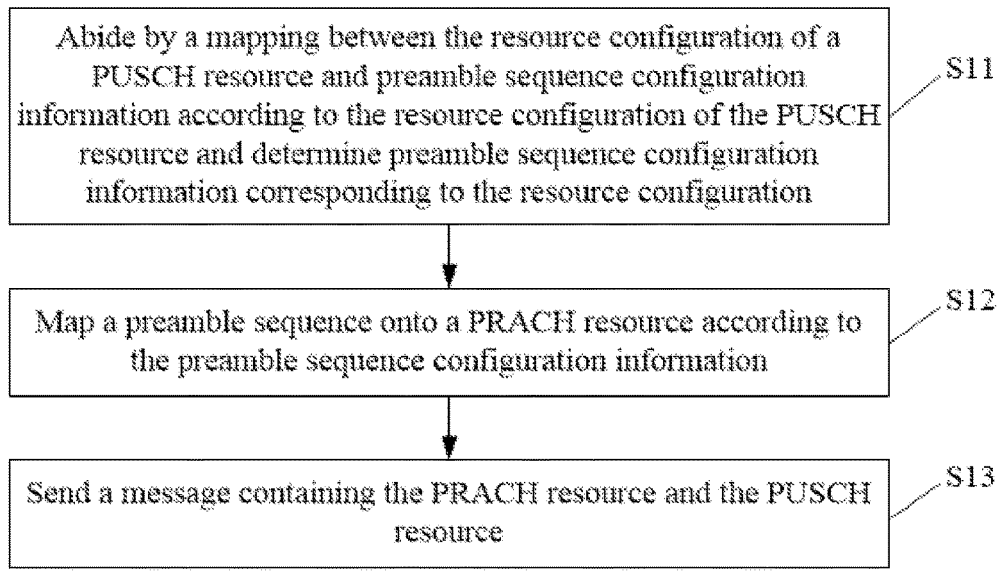
FIG. 1 is a flowchart of implementing a data transmission method according to embodiments of the present application.

For different PRACH interlace mapping modes, embodiments of the present application provide a data transmission method. FIG. 1 is a flowchart of implementing the data transmission method according to embodiments of the present application. The method includes the steps described hereinafter.

In step S11, a mapping relationship between the resource configuration of a PUSCH resource and preamble sequence configuration information is abided by according to the resource configuration of the PUSCH resource, and preamble sequence configuration information corresponding to the resource configuration is determined.

In step S12, a preamble sequence is mapped onto a PRACH resource according to the preamble sequence configuration information.

In step S13, a message containing the PRACH resource and the PUSCH resource is sent.

In one implementation, information in the PUSCH resource includes at least one of: a UE ID or user plane data. The preceding message may be a random access message or a data packet message.

The method of this embodiment of the present application can be applied to a UE. Before step S11, the method may further include that the UE receives the mapping relationship between the resource configuration of the PUSCH resource and the preamble sequence configuration information, where the mapping relationship is sent by a base station.

In one implementation, the preamble sequence configuration information may include at least one of: a preamble ID, an interlace ID, the number (that is, N in Table 1) of RBs contained in each interlace block occupied by the preamble sequence, or time-frequency position information of the preamble sequence.

In one implementation, the preamble ID may include at least one of a preamble index, a preamble group index, or a sequence number of a preamble in a preamble group.

In one implementation, the interlace ID may include at least one of an interlace index, an interlace group index, or a sequence number of an interlace block in an interlace block group.

After determining the resource configuration of the PUSCH resource, through step S11, the UE can determine, according to the mapping relationship between the resource configuration of the PUSCH resource and the preamble sequence configuration information, the preamble sequence configuration information used for mapping the preamble sequence.

In one implementation, the resource configuration of the PUSCH resource includes at least one of: a demodulation reference signal (DMRS) port index corresponding to the PUSCH resource, frequency domain resource information of the PUSCH resource, time domain resource information of the PUSCH resource, a payload size of the message, a waveform, an SCS, or a modulation and coding scheme.

The frequency domain resource information of the PUSCH resource may include a number of RBs occupied by the frequency domain resource of the PUSCH resource and an offset of the position of the frequency domain resource of the PUSCH resource relative to the frequency domain position of the preamble sequence.

In one implementation, the position of the frequency domain resource of the PUSCH resource may include at least one of: a RB index of the start point of the frequency domain resource of the PUSCH resource, an interlace index of the frequency domain resource of the PUSCH resource, or a RB index of the frequency domain resource of the PUSCH resource in an interlace block.

The time domain resource information of the PUSCH resource may include a number of slots or mini-slots occupied by the time domain resource of the PUSCH resource and an offset of the position of the time domain resource of the PUSCH resource relative to the time domain position of the preamble sequence.

In one implementation, the position of the time domain resource of the PUSCH resource includes at least one of: a system frame number (SFN) of the start point of the time domain resource of the PUSCH resource, a subframe number of the start point of the time domain resource of the PUSCH resource, a slot position or mini-slot position of the start point of the time domain resource of the PUSCH resource, or a start symbol of the time domain resource of the PUSCH resource.

In one implementation, when determining the resource configuration of the PUSCH resource of the UE, the UE may first determine a modulation and coding scheme (MCS) level according to the payload size and channel condition of the UE. For example, a UE located in the center of a cell and having a better channel condition may transmit data by using MCS levels of a higher MCS order, and a UE having a worse channel condition may transmit data by using MCS levels of a lower MCS order. Then, the UE determines the resource configuration of the PUSCH resource of the UE according to the determined MCS level, for example, the size of an occupied time-frequency resource (including the number of RBs).

For the configuration of 2-step RACH PUSCH RBs, user may be configured by using different granularities, and mapping with different preamble resource pools is performed. The preamble resource pools may be preamble resource pools of NR/Long-Term Evolution (LTE) or may be newly added preamble resource pools. The value of a typical granularity is 1 RB, 2 RBs, 3 RBs or 6 RBs.

The UE may select a preamble resource pool according to a reference signal received power (RSRP) and a transport block size (TBSize).

If the RSRP is greater than or equal to the RSRP threshold (RSRP0) and the TBSize is greater than or equal to the TBSize threshold (TBSize0), the UE may select a preamble resource pool corresponding to the maximum RB resource granularity.

If any one of the RSRP and the TBSize is greater than or equal to the corresponding threshold, the UE may select a preamble resource pool corresponding to a relatively large RB resource granularity.

If the RSRP is less than or equal to the RSRP threshold (RSRP0) and the TBSize is less than or equal to the TBSize threshold (TBSize0), the UE may select a preamble resource pool corresponding to the minimum RB resource granularity.

After the preamble resource pool and the corresponding RB resource granularity are determined, the MCS level can be determined.

Moreover, the RSRP may be replaced by a pathloss. The preceding preamble resource pools may have an equal size. Alternatively, the size of each preamble resource pool may be determined according to the possible distribution of the sizes of different pieces of information carried in different PUSCH resources.

In an interlace-present resource configuration scenario, user's DMRS-port-related information such as a DMRS port index or a DMRS orthogonal cover code (OCC) pattern is related to the interlace ID and the preamble ID. In an interlace-absent resource configuration scenario, user's DMRS-port-related information such as a DMRS port index or a DMRS OCC pattern is related to the preamble ID.

Alternatively, the UE may calculate the MCS level according to the payload size of the UE and the size of a selected time-frequency resource block. For example, if a larger time-frequency resource block is selected, the MCS order used may be lower. The MCS used in modulation of at least part of the payload size includes at least one of binary phase shift keying (BPSK) modulation, pi/2-BPSK modulation and quadrature phase shift keying (QPSK) modulation.

After determining the resource configuration of the PUSCH resource of the UE, the UE may determine, according to a preset rule, the preamble sequence configuration information corresponding to the resource configuration of the PUSCH resource. The preset rule may be the mapping relationship between the resource configuration of the PUSCH resource and the preamble sequence configuration information. The preset rule is sent by the base station to the UE in advance. The preset rule may be based on the interlace index, the number of RBs occupied by the interlace block, a possible start or end point of the interlace block, or preamble-sequence-related information in the interlace block. The related information may include the preamble index, cyclic shift (CS) information of the preamble sequence, the size of the bandwidth occupied by the preamble in the interlace block, the number of RBs of the preamble in the interlace block, and the time-frequency position of the preamble.

In the case where a non-uniform PRB-level interlace pattern exists in PRACH mapping, for different interlace patterns, the MCS mode, the payload size and the traffic model used by the UE may be indicated by information related to the interlace block in which the user's preamble is located. For example, the start point of the interlace block, the end point of the interlace block, the size range of the interlace block, the interlace index, the preamble index, the CS of the preamble, or the number of RBs contained in the interlace block corresponds to a different resource configuration of the PUSCH resource. The interlace ID indicates a different DMRS port index and a system-supported resource granularity item for a different PUSCH scheduling.

Tables 2A and 2B describe examples of the mapping relationship between the resource configuration of the PUSCH resource and the preamble sequence configuration information in different interlace patterns in embodiment of the present application.

In Table 2A, the first column describes the preamble sequence configuration information, specifically, interlace index; and the last six columns describe the resource configuration of the PUSCH resource, including the DMRS port index, the frequency domain resource information of the PUSCH resource and the time domain resource information of the PUSCH resource. After determining the resource configuration of the PUSCH resource of the UE, the UE abides by the mapping relationship in Table 2A according to the resource configuration of the PUSCH resource and determines the corresponding preamble sequence configuration information; and then performs mapping of the preamble sequence according to the preamble sequence configuration information.

In Tables 2A and 2B, the value range of the DMRS port index is integers from 1 to 4, that is, includes 1, 2, 3 and 4. In other implementations of the present application, the

TABLE 2A

| Interlace Index | DMRS Port Index | Number of RBs Occupied by Frequency Domain Resource of PUSCH Resource | Interlace Index of Frequency Domain Resource of PUSCH Resource | RB Index of Frequency Domain Resource of PUSCH Resource in Interlace Block | Number of Slots/ Mini-Slots Occupied by Time Domain Resource of PUSCH Resource | Offset of Position of Time Domain Resource of PUSCH Resource Relative to Time Domain Position of Preamble Sequence |
|---|---|---|---|---|---|---|
| 1  | 1 | 1 | 1 | 1 | 1 | 1 |
| 2  | 2 | 1 | 1 | 1 | 1 | 1 |
| 3  | 3 | 1 | 1 | 1 | 1 | 1 |
| 4  | 4 | 1 | 1 | 1 | 1 | 1 |
| 5  | 1 | 1 | 1 | 2 | 1 | 2 |
| 6  | 2 | 1 | 1 | 2 | 1 | 2 |
| 7  | 3 | 1 | 1 | 2 | 1 | 2 |
| 8  | 4 | 1 | 1 | 2 | 1 | 2 |
| 9  | 1 | 1 | 1 | 3 | 1 | 3 |
| 10 | 2 | 1 | 1 | 3 | 1 | 3 |
| 11 | 3 | 1 | 1 | 3 | 1 | 3 |
| 12 | 4 | 1 | 1 | 3 | 1 | 3 |

In Table 2B, the first column describes the preamble sequence configuration information, specifically, interlace index, and the last seven columns describe the resource configuration of the PUSCH resource, including the DMRS port index, the frequency domain resource information of the PUSCH resource and the time domain resource information of the PUSCH resource. After determining the resource configuration of the PUSCH resource of the UE, the UE abides by the mapping relationship in Table 2B according to the resource configuration of the PUSCH resource and determines the corresponding preamble sequence configuration information; and then performs mapping of the preamble sequence according to the preamble sequence configuration information.

value range of the DMRS port index may include other ranges, for example, integers from 0 to 3, that is, 0, 1, 2 and 3; or integers from 0 to 5, that is, 0, 1, 2, 3, 4 and 5; or integers from 0 to 7, that is, 0, 1, 2, 3, 4, 5, 6 and 7; or integers from 0 to 11, that is, 0, 1, 2, 3, 4, 5, 6, 7, 8, 9, 10 and 11; or integers from 1 to 4, that is, 1, 2, 3 and 4; or integers from 1 to 6, that is, 1, 2, 3, 4, 5 and 6; or integers from 1 to 8, that is, 1, 2, 3, 4, 5, 6, 7 and 8; or integers from 1 to 12, that is, 1, 2, 3, 4, 5, 6, 7, 8, 9, 10, 11 and 12.

Table 3 describes an example of the mapping relationship between the resource configuration of the PUSCH resource and the preamble sequence configuration information in different interlace patterns in embodiments of the present application.

TABLE 2B

| Interlace Index | DMRS Port Index | Number of RBs Occupied by Frequency Domain Resource of PUSCH Resource | Interlace Index of Frequency Domain Resource of PUSCH Resource | RB Index of Frequency Domain Resource of PUSCH Resource in Interlace Block | Number of Slots/ Mini-Slots Occupied by Time Domain Resource of PUSCH Resource | SFN of Start Point of Time Domain Resource of PUSCH Resource | Subframe Number of Start Point of Time Domain Resource of PUSCH Resource |
|---|---|---|---|---|---|---|---|
| 1  | 1 | 1 | 1 | 1 | 1 | 1 | 1 |
| 2  | 2 | 1 | 1 | 1 | 1 | 1 | 2 |
| 3  | 3 | 1 | 1 | 1 | 1 | 1 | 3 |
| 4  | 4 | 1 | 1 | 1 | 1 | 1 | 4 |
| 5  | 1 | 1 | 1 | 2 | 1 | 1 | 5 |
| 6  | 2 | 1 | 1 | 2 | 1 | 1 | 6 |
| 7  | 3 | 1 | 1 | 2 | 1 | 1 | 7 |
| 8  | 4 | 1 | 1 | 2 | 1 | 1 | 8 |
| 9  | 1 | 1 | 1 | 3 | 1 | 1 | 9 |
| 10 | 2 | 1 | 1 | 3 | 1 | 1 | 10 |
| 11 | 3 | 1 | 1 | 3 | 1 | 2 | 1 |
| 12 | 4 | 1 | 1 | 3 | 1 | 2 | 2 |

The mappings relationship described in Tables 2A and 2B may be applied to a scenario in which the preamble resource is 15 kHz and an NR type I front loaded symbol serves as an OFDM symbol. The association rules described in Tables 2A and 2B are determined according to information such as the DMRS port configuration of PUSCH and the size of possibly occupied RBs, that is, multiplexed on one resource and shifted apart in the time domain and the frequency domain.

The first column describes the preamble sequence configuration information: the number of RBs contained in each interlace block occupied by the preamble sequence, and the second column describes the resource configuration of the PUSCH resource: waveform. The possible value of the waveform may be a cyclic prefix orthogonal frequency division multiplexing (CP-OFDM) waveform or a discrete Fourier transform spread orthogonal frequency division multiplexing (DFT-S-OFDM) waveform.

After determining the resource configuration of the PUSCH resource of the UE, the UE abides by the mapping relationship in Table 3 according to the resource configuration of the PUSCH resource and determines the corresponding preamble sequence configuration information; and then performs mapping of the preamble sequence according to the preamble sequence configuration information.

TABLE 3

| Number of RBs Contained in Each Interlace Block Occupied by Preamble Sequence | Waveform |
| --- | --- |
| 13 | CP-OFDM |
| 12 | DFT-S-OFDM |

For the DFT-S-OFDM waveform, the value of N is preferably a multiple of 2, 3 or 5 to facilitate waveform generation. Therefore, in the case where both 12 RBs and 13 RBs exist and two waveforms are indicated, the case where 13 RBs are contained in each interlace block occupied by the preamble sequence indicates the CP-OFDM waveform, and the case where 12 RBs are contained in each interlace block occupied by the preamble sequence indicates the DFT-S-OFDM waveform.

Table 4 describes an example of the mapping relationship between the resource configuration of the PUSCH resource and the preamble sequence configuration information in different interlace patterns in embodiments of the present application.

The first column describes the preamble sequence configuration information: the number of RBs contained in each interlace block occupied by the preamble sequence, and the second column describes the resource configuration of the PUSCH resource: payload size. In Table 4, the possible value of the payload size may be 56 bits or 72 bits.

After determining the resource configuration of the PUSCH resource of the UE, the UE abides by the mapping relationship in Table 4 according to the resource configuration of the PUSCH resource and determines the corresponding preamble sequence configuration information; and then performs mapping of the preamble sequence according to the preamble sequence configuration information.

TABLE 4

| Number of RBs Contained in Each Interlace Block Occupied by Preamble Sequence | Payload Size |
| --- | --- |
| 10 | 56 bits |
| 11 | 72 bits |

Table 5A describes an example of the mapping relationship between the resource configuration of the PUSCH resource and the preamble sequence configuration information in different interlace patterns in embodiments of the present application.

The first column describes the preamble sequence configuration information: interlace index, and the second column describes the resource configuration of the PUSCH resource: waveform. The possible value of the waveform may be a CP-OFDM waveform or a DFT-S-OFDM waveform.

After determining the resource configuration of the PUSCH resource of the UE, the UE abides by the mapping relationship in Table 5A according to the resource configuration of the PUSCH resource and determines the corresponding preamble sequence configuration information; and then performs mapping of the preamble sequence according to the preamble sequence configuration information.

TABLE 5A

| Interlace Index | Waveform |
| --- | --- |
| 1 to K | CP-OFDM |
| K + 1 to M | DFT-S-OFDM |

The interlace index may have more than two values; therefore, in Table 5A, some possible values of the interlace index correspond to the CP-OFDM waveform, and other possible values of the interlace index correspond to the DFT-S-OFDM waveform. In Table 5A, K is an integer greater than 1 and less than (M−1). Table 5 describes merely an example. In embodiments of the present application, interlace indexes corresponding to one type of waveform may be discontinuous.

Table 5B describes an example of the mapping relationship between the resource configuration of the PUSCH resource and the preamble sequence configuration information in different interlace patterns in embodiments of the present application.

The first column describes the preamble sequence configuration information: interlace group index, and the second column describes the resource configuration of the PUSCH resource: waveform. The possible value of the waveform may be a CP-OFDM waveform or a DFT-S-OFDM waveform.

After determining the resource configuration of the PUSCH resource of the UE, the UE abides by the mapping relationship in Table 5B according to the resource configuration of the PUSCH resource and determines the corresponding preamble sequence configuration information; and then performs mapping of the preamble sequence according to the preamble sequence configuration information.

TABLE 5B

| Interlace Group Index | Waveform |
| --- | --- |
| 1 | CP-OFDM |
| 2 | DFT-S-OFDM |

Table 6A describes an example of the mapping relationship between the resource configuration of the PUSCH resource and the preamble sequence configuration information in different interlace patterns in embodiments of the present application.

The first column describes the preamble sequence configuration information: interlace index, and the second column describes the resource configuration of the PUSCH resource: payload size. In Table 6A, the possible value of the payload size may be 56 bits or 72 bits.

After determining the resource configuration of the PUSCH resource of the UE, the UE abides by the mapping relationship in Table 6A according to the resource configuration of the PUSCH resource and determines the corresponding preamble sequence configuration information; and then performs mapping of the preamble sequence according to the preamble sequence configuration information.

TABLE 6A

| interlace index | payload size |
| --- | --- |
| 1 to Q | 56 bits |
| Q + 1 to M | 72 bits |

The interlace index may have more than two values; therefore, in Table 6A, some possible values of the interlace index correspond to 56 bits, and other possible values of the interlace index correspond to 72 bits. In Table 6A, Q is an integer greater than 1 and less than M−1. Table 6A describes merely an example. In embodiments of the present application, interlace indexes corresponding to one payload size may be discontinuous. Moreover, the payload size may have values such as 144 bits and 208 bits. Similarly, in implementations of the present application, different values of the interlace index may correspond to values of four or more payload sizes.

Table 6B describes an example of the mapping relationship between the resource configuration of the PUSCH resource and the preamble sequence configuration information in different interlace patterns in embodiments of the present application.

The first column describes the preamble sequence configuration information: interlace group index, and the second column describes the resource configuration of the PUSCH resource: payload size. In Table 6B, the possible value of the payload size may be 56 bits or 72 bits.

After determining the resource configuration of the PUSCH resource of the UE, the UE abides by the mapping relationship in Table 6B according to the resource configuration of the PUSCH resource and determines the corresponding preamble sequence configuration information; and then performs mapping of the preamble sequence according to the preamble sequence configuration information.

TABLE 6B

| Interlace Group Index | Payload Size |
| --- | --- |
| 1 | 56 bits |
| 2 | 72 bits |

In embodiments of the present application, different combinations of waveform and payload size may be indicated. See Table 7A.

Table 7A describes an example of the mapping relationship between the resource configuration of the PUSCH resource and the preamble sequence configuration information in different interlace patterns in embodiments of the present application.

The first column describes the preamble sequence configuration information: interlace index, and the second column describes the resource configuration of the PUSCH resource: combination of waveform and payload size.

After determining the resource configuration of the PUSCH resource of the UE, the UE abides by the mapping relationship in Table 7A according to the resource configuration of the PUSCH resource and determines the corresponding preamble sequence configuration information; and then performs mapping of the preamble sequence according to the preamble sequence configuration information.

TABLE 7A

| Interlace Index | Waveform and Payload Size |
| --- | --- |
| 1 to G | CP-OFDM and 56 bits |
| (G + 1) to L | DFT-S-OFDM and 72 bits |
| (L + 1) to T | CP-OFDM and 72 bits |
| (T + 1) to M | DFT-S-OFDM and 56 bits |

In Table 7A, the combination of waveform and payload size may have four possible values. In Table 7A, G, L and T are integers greater than 1 and less than M−1, and G<L<T. The three integers G, L and T divide some possible values of the interlace index into four parts. Each part corresponds to one possible value of the combination of waveform and payload size. Table 7A describes merely an example. In embodiments of the present application, interlace indexes corresponding to one combination of waveform and payload size may be discontinuous.

Table 7B describes an example of the mapping relationship between the resource configuration of the PUSCH resource and the preamble sequence configuration information in different interlace patterns in embodiments of the present application.

The first column describes the preamble sequence configuration information: interlace group index, and the second column describes the resource configuration of the PUSCH resource: combination of waveform and payload size.

After determining the resource configuration of the PUSCH resource of the UE, the UE abides by the mapping relationship in Table 7B according to the resource configuration of the PUSCH resource and determines the corresponding preamble sequence configuration information; and then performs mapping of the preamble sequence according to the preamble sequence configuration information.

TABLE 7B

| Interlace Group Index | Waveform and Payload Size |
| --- | --- |
| 1 | CP-OFDM and 56 bits |
| 2 | DFT-S-OFDM and 72 bits |
| 3 | CP-OFDM and 72 bits |
| 4 | DFT-S-OFDM and 56 bits |

Table 8A describes an example of the mapping relationship between the resource configuration of the PUSCH resource and the preamble sequence configuration information in different interlace patterns in embodiments of the present application.

The first column describes the preamble sequence configuration information: interlace index, and the second column describes the resource configuration of the PUSCH resource: SCS. The possible value of the SCS may be 15 kHz, 30 kHz or 60 kHz.

After determining the resource configuration of the PUSCH resource of the UE, the UE abides by the mapping relationship in Table 8A according to the resource configuration of the PUSCH resource and determines the corresponding preamble sequence configuration information; and then performs mapping of the preamble sequence according to the preamble sequence configuration information.

TABLE 8A

| Interlace Index | SCS (kHz) |
| --- | --- |
| 1 | 15 |
| 2 | 15 |
| 3 | 15 |
| 4 | 15 |

TABLE 8A-continued

| Interlace Index | SCS (kHz) |
|---|---|
| 5 | 30 |
| 6 | 30 |
| 7 | 30 |
| 8 | 30 |
| 9 | 60 |
| 10 | 60 |
| 11 | 60 |
| 12 | 60 |

Table 8A describes merely an example. In embodiments of the present application, interlace indexes corresponding to one type of SCS may be discontinuous.

Table 8B describes an example of the mapping relationship between the resource configuration of the PUSCH resource and the preamble sequence configuration information in different interlace patterns in embodiments of the present application.

The first column describes the preamble sequence configuration information: interlace group index, and the second column describes the resource configuration of the PUSCH resource: SCS. The possible value of the SCS may be 15 kHz, 30 kHz or 60 kHz.

After determining the resource configuration of the PUSCH resource of the UE, the UE abides by the mapping relationship in Table 8B according to the resource configuration of the PUSCH resource and determines the corresponding preamble sequence configuration information; and then performs mapping of the preamble sequence according to the preamble sequence configuration information.

TABLE 8B

| Interlace Group Index | SCS (kHz) |
|---|---|
| 1 | 15 |
| 2 | 30 |
| 3 | 60 |

The possible value of the SCS may be 15 kHz, 30 kHz, 60 kHz or 120 kHz. Table 9A describes an example of the mapping relationship between the resource configuration of the PUSCH resource and the preamble sequence configuration information in different interlace patterns in embodiments of the present application.

The first column describes the preamble sequence configuration information: interlace index, and the second column describes the resource configuration of the PUSCH resource: SCS. The possible value of the SCS may be 15 kHz, 30 kHz, 60 kHz or 120 kHz.

TABLE 9A

| Interlace Index | SCS (kHz) |
|---|---|
| 1 | 15 |
| 2 | 15 |
| 3 | 15 |
| 4 | 30 |
| 5 | 30 |
| 6 | 30 |
| 7 | 60 |
| 8 | 60 |
| 9 | 60 |
| 10 | 120 |
| 11 | 120 |
| 12 | 120 |

Table 9A describes merely an example. In embodiments of the present application, interlace indexes corresponding to one type of SCS may be discontinuous.

Table 9B describes an example of the mapping relationship between the resource configuration of the PUSCH resource and the preamble sequence configuration information in different interlace patterns in embodiments of the present application.

The first column describes the preamble sequence configuration information: interlace group index, and the second column describes the resource configuration of the PUSCH resource: SCS. The possible value of the SCS may be 15 kHz, 30 kHz, 60 kHz or 120 kHz.

TABLE 9B

| Interlace Group Index | SCS (kHz) |
|---|---|
| 1 | 15 |
| 2 | 30 |
| 3 | 60 |
| 4 | 120 |

Tables 5A to 9B describe a mapping relationship between interlace index/interlace group index and payload size/waveform/SCS. In embodiments of the present application, mapping of the resource configuration of the PUSCH resource may be performed by using another interlace ID, for example, the sequence number of the interlace block in the interlace block group.

In implementations of the present application, in an interlace-absent case, mapping of the resource configuration of the PUSCH resource may be performed by using a preamble group ID. Table 10 describes an example of the mapping relationship between the resource configuration of the PUSCH resource and the preamble sequence configuration information in an interlace-absent case in embodiments of the present application.

The first column describes the preamble sequence configuration information: preamble group index, and the second column describes the resource configuration of the PUSCH resource: waveform. The possible value of the waveform may be a CP-OFDM waveform or a DFT-S-OFDM waveform.

After determining the resource configuration of the PUSCH resource of the UE, the UE abides by the mapping relationship in Table 10 according to the resource configuration of the PUSCH resource and determines the corresponding preamble sequence configuration information; and then performs mapping of the preamble sequence according to the preamble sequence configuration information.

TABLE 10

| Preamble Group Index | Waveform |
|---|---|
| 1 | CP-OFDM |
| 2 | DFT-S-OFDM |

In Table 10, the sequence numbers of preamble sequences in one preamble group may be discontinuous.

Table 11 describes an example of the mapping relationship between the resource configuration of the PUSCH resource and the preamble sequence configuration information in an interlace-absent case in embodiments of the present application.

The first column describes the preamble sequence configuration information: preamble group index, and the second column describes the resource configuration of the PUSCH resource: payload size. The possible value of the payload size may be 56 bits or 72 bits.

After determining the resource configuration of the PUSCH resource of the UE, the UE abides by the mapping relationship in Table 11 according to the resource configuration of the PUSCH resource and determines the corresponding preamble sequence configuration information; and then performs mapping of the preamble sequence according to the preamble sequence configuration information.

TABLE 11

| Preamble Group Index | Payload Size |
|---|---|
| A | 56 bits |
| B | 72 bits |

Table 12 describes an example of the mapping relationship between the resource configuration of the PUSCH resource and the preamble sequence configuration information in an interlace-absent case in embodiments of the present application.

The first column describes the preamble sequence configuration information: preamble group index, and the second column describes the resource configuration of the PUSCH resource: combination of waveform and payload size.

After determining the resource configuration of the PUSCH resource of the UE, the UE abides by the mapping relationship in Table 12 according to the resource configuration of the PUSCH resource and determines the corresponding preamble sequence configuration information; and then performs mapping of the preamble sequence according to the preamble sequence configuration information.

TABLE 12

| Preamble Group Index | Waveform and Payload Size |
|---|---|
| 1 | CP-OFDM and 56 bits |
| 2 | DFT-S-OFDM and 72 bits |
| 3 | CP-OFDM and 72 bits |
| 4 | DFT-S-OFDM and 56 bits |

In Table 12, the sequence numbers of preamble sequences in one preamble group may be discontinuous.

In the preceding implementation, the possible value of the payload size may be 56 bits or 72 bits. In implementations of the present application, the possible value of the payload size may be 56 bits, 72 bits, 144 bits or 208 bits. Table 13 describes an example of the mapping relationship between the resource configuration of the PUSCH resource and the preamble sequence configuration information in an interlace-absent case in embodiments of the present application.

The first column describes the preamble sequence configuration information: preamble group index, and the second column describes the resource configuration of the PUSCH resource: payload size.

After determining the resource configuration of the PUSCH resource of the UE, the UE abides by the mapping relationship in Table 13 according to the resource configuration of the PUSCH resource and determines the corresponding preamble sequence configuration information; and then performs mapping of the preamble sequence according to the preamble sequence configuration information.

TABLE 13

| Preamble Group Index | Payload Size |
|---|---|
| 1 | 56 bits |
| 2 | 72 bits |
| 3 | 144 bits |
| 4 | 208 bits |

In Table 13, the sequence numbers of preamble sequences in one preamble group may be discontinuous.

Tables 10 to 13 describe a mapping relationship between preamble group index and payload size/waveform. In the preceding implementation, the preamble group index is used as an example. The preamble group index is a possible case of the preamble ID. Embodiments of the present application may have other implementations. For example, the preamble index replaces the preamble group index in the preceding mapping tables. See Tables 10B to 13B. Alternatively, the sequence number of the preamble in the preamble group replaces the preamble group index in the preceding mapping tables. See Tables 10C to 13C. In the preceding implementations, mapping between the preamble ID and the resource configuration of the PUSCH resource is performed. It is to be noted that in Tables 10C to 13C, even if different symbols are used for denotation, if preamble allocation is balanced among different groups, then the maximum values of the sequence numbers of the preambles may be equal among different groups.

TABLE 10B

| Preamble Index | Waveform |
|---|---|
| 1 to W | CP-OFDM |
| (W + 1) to N | DFT-S-OFDM |

TABLE 11B

| Preamble Index | Payload Size |
|---|---|
| 1 to O | 56 bits |
| (O + 1) to P | 72 bits |

TABLE 12B

| Preamble Index | Waveform and Payload Size |
|---|---|
| 1 to J | CP-OFDM and 56 bits |
| (J + 1) to D | DFT-S-OFDM and 72 bits |
| (D + 1) to E | CP-OFDM and 72 bits |
| (E + 1) to F | DFT-S-OFDM and 56 bits |

TABLE 13B

| Preamble Index | Payload Size |
|---|---|
| 1 to S | 56 bits |
| (S + 1) to H | 72 bits |
| (H + 1) to I | 144 bits |
| (I + 1) to R | 208 bits |

TABLE 10C

| Sequence Number of Preamble in Preamble Group | Waveform |
|---|---|
| 1 to U | CP-OFDM |
| 1 to V | DFT-S-OFDM |

TABLE 11C

| Sequence Number of Preamble in Preamble Group | Payload Size |
|---|---|
| 1 to U' | 56 bits |
| 1 to V' | 72 bits |

TABLE 12C

| Sequence Number of Preamble in Preamble Group | Waveform and Payload Size |
|---|---|
| 1 to $\lambda$ | CP-OFDM and 56 bits |
| 1 to $\mu$ | DFT-S-OFDM and 72 bits |
| 1 to $\Phi$ | CP-OFDM and 72 bits |
| 1 to $\delta$ | DFT-S-OFDM and 56 bits |

TABLE 13C

| Sequence Number of Preamble in Preamble Group | Payload Size |
|---|---|
| 1 to $\sigma$ | 56 bits |
| 1 to $\rho$ | 72 bits |
| 1 to $\pi$ | 144 bits |
| 1 to $\omega$ | 208 bits |

Moreover, the resource configuration of the PUSCH resource may further include the MCS. The MCS may include at least one of: BPSK modulation, pi/2-BPSK modulation or QPSK modulation. Tables 13D and 13E describe examples of the mapping relationship between the resource configuration of the PUSCH resource and the preamble sequence configuration information in an interlace-absent case in embodiments of the present application.

In Table 13D, the first column describes the preamble sequence configuration information: sequence number of preamble in preamble group, and the second column describes the resource configuration of the PUSCH resource: combination of MCS index and payload size. In Table 13D, the MCS index has two values that can represent two MCSs.

TABLE 13D

| Sequence Number of Preamble in Preamble Group | MCS Index and Payload Size |
|---|---|
| 1 to $\sigma$ | 0 and 56 bits |
| 1 to $\rho$ | 1 and 56 bits |
| 1 to $\pi$ | 0 and 72 bits |
| 1 to $\omega$ | 1 and 72 bits |

In Table 13D, the first column describes the preamble sequence configuration information: preamble sequence number, and the second column describes the resource configuration of the PUSCH resource: combination of MCS index and payload size. In Table 13E, the MCS index has two values that can represent two MCSs.

TABLE 13E

| Preamble Sequence Number | MCS Index and Payload Size |
|---|---|
| 1 to S | 0 and 56 bits |
| (S + 1) to H | 1 and 56 bits |
| (H + 1) to I | 0 and 72 bits |
| (I + 1) to R | 1 and 72 bits |

Table 14 describes an example of the mapping relationship between the resource configuration of the PUSCH resource and the preamble sequence configuration information in different interlace patterns in embodiments of the present application. In this embodiment, one RACH occasion (RO) contains multiple (for example, 64) preamble sequences, so the resource configuration of the PUSCH resource may be jointly indicated by the preamble index and the interlace index. In Table 14, the first column and the second column describe the preamble sequence configuration information including the interlace index and the preamble index, and the last five columns describe the resource configuration of the PUSCH resource, including the DMRS port index, the frequency domain resource information of the PUSCH resource and the time domain resource information of the PUSCH resource.

After determining the resource configuration of the PUSCH resource of the UE, the UE abides by the mapping relationship in Table 14 according to the resource configuration of the PUSCH resource and determines the corresponding preamble sequence configuration information; and then performs mapping of the preamble sequence according to the preamble sequence configuration information.

TABLE 14

| Interlace Index | Preamble Index | DMRS Port Index | Number of RBs Occupied by Frequency Domain Resource of PUSCH Resource | RB Index of Frequency Domain Resource of PUSCH Resource in Interlace Block | Number of Slots/Mini-Slots Occupied by Time Domain Resource of PUSCH Resource | Offset of Position of Time Domain Resource of PUSCH Resource Relative to Time Domain Position of Preamble Sequence |
|---|---|---|---|---|---|---|
| 1 | 1 | 1 | 1 | 1 | 1 | 1 |
| 1 | 2 | 2 | 1 | 1 | 1 | 1 |
| 1 | 3 | 3 | 1 | 1 | 1 | 1 |
| 1 | 4 | 4 | 1 | 1 | 1 | 1 |
| 1 | 5 | 5 | 1 | 1 | 1 | 1 |
| 1 | 6 | 6 | 1 | 1 | 1 | 1 |
| 1 | 7 | 7 | 1 | 1 | 1 | 1 |
| 1 | 8 | 8 | 1 | 1 | 1 | 1 |
| 1 | 9 | 9 | 1 | 1 | 1 | 1 |
| 1 | 10 | 10 | 1 | 1 | 1 | 1 |

TABLE 14-continued

| Interlace Index | Preamble Index | DMRS Port Index | Number of RBs Occupied by Frequency Domain Resource of PUSCH Resource | RB Index of Frequency Domain Resource of PUSCH Resource in Interlace Block | Number of Slots/Mini-Slots Occupied by Time Domain Resource of PUSCH Resource | Offset of Position of Time Domain Resource of PUSCH Resource Relative to Time Domain Position of Preamble Sequence |
|---|---|---|---|---|---|---|
| 1 | 11 | 11 | 1 | 1 | 1 | 1 |
| 1 | 12 | 12 | 1 | 1 | 1 | 1 |
| 1 | 13 | 1 | 1 | 2 | 1 | 1 |
| 1 | 14 | 2 | 1 | 2 | 1 | 1 |
| 1 | 15 | 3 | 1 | 2 | 1 | 1 |
| 1 | 16 | 4 | 1 | 2 | 1 | 1 |
| 1 | 17 | 5 | 1 | 2 | 1 | 1 |
| 1 | 18 | 6 | 1 | 2 | 1 | 1 |
| 1 | 19 | 7 | 1 | 2 | 1 | 1 |
| 1 | 20 | 8 | 1 | 2 | 1 | 1 |
| 1 | 21 | 9 | 1 | 2 | 1 | 1 |
| 1 | 22 | 10 | 1 | 2 | 1 | 1 |
| 1 | 23 | 11 | 1 | 2 | 1 | 1 |
| 1 | 24 | 12 | 1 | 2 | 1 | 1 |
| 1 | 25 | 1 | 1 | 3 | 1 | 1 |
| 1 | 26 | 2 | 1 | 3 | 1 | 1 |
| 1 | 27 | 3 | 1 | 3 | 1 | 1 |
| 1 | 28 | 4 | 1 | 3 | 1 | 1 |
| 1 | 29 | 5 | 1 | 3 | 1 | 1 |
| 1 | 30 | 6 | 1 | 3 | 1 | 1 |
| 1 | 31 | 7 | 1 | 3 | 1 | 1 |
| 1 | 32 | 8 | 1 | 3 | 1 | 1 |
| 1 | 33 | 9 | 1 | 3 | 1 | 1 |
| 1 | 34 | 10 | 1 | 3 | 1 | 1 |
| 1 | 35 | 11 | 1 | 3 | 1 | 1 |
| 1 | 36 | 12 | 1 | 3 | 1 | 1 |
| 1 | 37 | 1 | 1 | 4 | 1 | 1 |
| 1 | 38 | 2 | 1 | 4 | 1 | 1 |
| 1 | 39 | 3 | 1 | 4 | 1 | 1 |
| 1 | 40 | 4 | 1 | 4 | 1 | 1 |
| 1 | 41 | 5 | 1 | 4 | 1 | 1 |
| 1 | 42 | 6 | 1 | 4 | 1 | 1 |
| 1 | 43 | 7 | 1 | 4 | 1 | 1 |
| 1 | 44 | 8 | 1 | 4 | 1 | 1 |
| 1 | 45 | 9 | 1 | 4 | 1 | 1 |
| 1 | 46 | 10 | 1 | 4 | 1 | 1 |
| 1 | 47 | 11 | 1 | 4 | 1 | 1 |
| 1 | 48 | 12 | 1 | 4 | 1 | 1 |
| 1 | 49 | 1 | 1 | 5 | 1 | 1 |
| 1 | 50 | 2 | 1 | 5 | 1 | 1 |
| 1 | 51 | 3 | 1 | 5 | 1 | 1 |
| 1 | 52 | 4 | 1 | 5 | 1 | 1 |
| 1 | 53 | 5 | 1 | 5 | 1 | 1 |
| 1 | 54 | 6 | 1 | 5 | 1 | 1 |
| 1 | 55 | 7 | 1 | 5 | 1 | 1 |
| 1 | 56 | 8 | 1 | 5 | 1 | 1 |
| 1 | 57 | 9 | 1 | 5 | 1 | 1 |
| 1 | 58 | 10 | 1 | 5 | 1 | 1 |
| 1 | 59 | 11 | 1 | 5 | 1 | 1 |
| 1 | 60 | 12 | 1 | 5 | 1 | 1 |
| 1 | 61 | 1 | 1 | 6 | 1 | 1 |
| 1 | 62 | 2 | 1 | 6 | 1 | 1 |
| 1 | 63 | 3 | 1 | 6 | 1 | 1 |
| 1 | 64 | 4 | 1 | 6 | 1 | 1 |
| 2 | 1 | 5 | 1 | 6 | 1 | 1 |
| 2 | 2 | 6 | 1 | 6 | 1 | 1 |
| 2 | 3 | 7 | 1 | 6 | 1 | 1 |
| 2 | 4 | 8 | 1 | 6 | 1 | 1 |
| 2 | 5 | 9 | 1 | 6 | 1 | 1 |
| 2 | 6 | 10 | 1 | 6 | 1 | 1 |
| 2 | 7 | 11 | 1 | 6 | 1 | 1 |
| 2 | 8 | 1 | 1 | 6 | 1 | 1 |
| 2 | 9 | 1 | 2 | 1 | 1 | 2 |
| 2 | 10 | 2 | 2 | 1 | 1 | 2 |
| 2 | 11 | 3 | 2 | 1 | 1 | 2 |
| 2 | 12 | 4 | 2 | 1 | 1 | 2 |
| 2 | 13 | 5 | 2 | 1 | 1 | 2 |
| 2 | 14 | 6 | 2 | 1 | 1 | 2 |
| 2 | 15 | 7 | 2 | 1 | 1 | 2 |
| 2 | 16 | 8 | 2 | 1 | 1 | 2 |
| 2 | 17 | 9 | 2 | 1 | 1 | 2 |
| 2 | 18 | 10 | 2 | 1 | 1 | 2 |

TABLE 14-continued

| Interlace Index | Preamble Index | DMRS Port Index | Number of RBs Occupied by Frequency Domain Resource of PUSCH Resource | RB Index of Frequency Domain Resource of PUSCH Resource in Interlace Block | Number of Slots/ Mini-Slots Occupied by Time Domain Resource of PUSCH Resource | Offset of Position of Time Domain Resource of PUSCH Resource Relative to Time Domain Position of Preamble Sequence |
|---|---|---|---|---|---|---|
| 2 | 19 | 11 | 2 | 1 | 1 | 2 |
| 2 | 20 | 12 | 2 | 1 | 1 | 2 |
| 2 | 21 | 1 | 2 | 3 | 1 | 2 |
| 2 | 22 | 2 | 2 | 3 | 1 | 2 |
| 2 | 23 | 3 | 2 | 3 | 1 | 2 |
| 2 | 24 | 4 | 2 | 3 | 1 | 2 |
| 2 | 25 | 5 | 2 | 3 | 1 | 2 |
| 2 | 26 | 6 | 2 | 3 | 1 | 2 |
| 2 | 27 | 7 | 2 | 3 | 1 | 2 |
| 2 | 28 | 8 | 2 | 3 | 1 | 2 |
| 2 | 29 | 9 | 2 | 3 | 1 | 2 |
| 2 | 30 | 10 | 2 | 3 | 1 | 2 |
| 2 | 31 | 11 | 2 | 3 | 1 | 2 |
| 2 | 32 | 12 | 2 | 3 | 1 | 2 |
| 2 | 33 | 1 | 2 | 5 | 1 | 2 |
| 2 | 34 | 2 | 2 | 5 | 1 | 2 |
| 2 | 35 | 3 | 2 | 5 | 1 | 2 |
| 2 | 36 | 4 | 2 | 5 | 1 | 2 |
| 2 | 37 | 5 | 2 | 5 | 1 | 2 |
| 2 | 38 | 6 | 2 | 5 | 1 | 2 |
| 2 | 39 | 7 | 2 | 5 | 1 | 2 |
| 2 | 40 | 8 | 2 | 5 | 1 | 2 |
| 2 | 41 | 9 | 2 | 5 | 1 | 2 |
| 2 | 42 | 10 | 2 | 5 | 1 | 2 |
| 2 | 43 | 11 | 2 | 5 | 1 | 2 |
| 2 | 44 | 12 | 2 | 5 | 1 | 2 |
| 2 | 45 | 1 | 2 | 7 | 1 | 2 |
| 2 | 46 | 2 | 2 | 7 | 1 | 2 |
| 2 | 47 | 3 | 2 | 7 | 1 | 2 |
| 2 | 48 | 4 | 2 | 7 | 1 | 2 |
| 2 | 49 | 5 | 2 | 7 | 1 | 2 |
| 2 | 50 | 6 | 2 | 7 | 1 | 2 |
| 2 | 51 | 7 | 2 | 7 | 1 | 2 |
| 2 | 52 | 8 | 2 | 7 | 1 | 2 |
| 2 | 53 | 9 | 2 | 7 | 1 | 2 |
| 2 | 54 | 10 | 2 | 7 | 1 | 2 |
| 2 | 55 | 11 | 2 | 7 | 1 | 2 |
| 2 | 56 | 12 | 2 | 7 | 1 | 2 |
| 2 | 57 | 1 | 2 | 9 | 1 | 2 |
| 2 | 58 | 2 | 2 | 9 | 1 | 2 |
| 2 | 59 | 3 | 2 | 9 | 1 | 2 |
| 2 | 60 | 4 | 2 | 9 | 1 | 2 |
| 2 | 61 | 5 | 2 | 9 | 1 | 2 |
| 2 | 62 | 6 | 2 | 9 | 1 | 2 |
| 2 | 63 | 7 | 2 | 9 | 1 | 2 |
| 2 | 64 | 8 | 2 | 9 | 1 | 2 |
| 3 | 1 | 9 | 2 | 9 | 1 | 2 |
| 3 | 2 | 10 | 2 | 9 | 1 | 2 |
| 3 | 3 | 11 | 2 | 9 | 1 | 2 |
| 3 | 4 | 12 | 2 | 9 | 1 | 2 |
| 3 | 5 | 1 | 2 | 1 | 2 | 3 |
| 3 | 6 | 2 | 2 | 1 | 2 | 3 |
| 3 | 7 | 3 | 2 | 1 | 2 | 3 |
| 3 | 8 | 4 | 2 | 1 | 2 | 3 |
| 3 | 9 | 5 | 2 | 1 | 2 | 3 |
| 3 | 10 | 6 | 2 | 1 | 2 | 3 |
| 3 | 11 | 7 | 2 | 1 | 2 | 3 |
| 3 | 12 | 8 | 2 | 1 | 2 | 3 |
| 3 | 13 | 9 | 2 | 1 | 2 | 3 |
| 3 | 14 | 10 | 2 | 1 | 2 | 3 |
| 3 | 15 | 11 | 2 | 1 | 2 | 3 |
| 3 | 16 | 12 | 2 | 1 | 2 | 3 |
| 3 | 17 | 1 | 2 | 3 | 2 | 3 |
| 3 | 18 | 2 | 2 | 3 | 2 | 3 |
| 3 | 19 | 3 | 2 | 3 | 2 | 3 |
| 3 | 20 | 4 | 2 | 3 | 2 | 3 |
| 3 | 21 | 5 | 2 | 3 | 2 | 3 |
| 3 | 22 | 6 | 2 | 3 | 2 | 3 |
| 3 | 23 | 7 | 2 | 3 | 2 | 3 |
| 3 | 24 | 8 | 2 | 3 | 2 | 3 |
| 3 | 25 | 9 | 2 | 3 | 2 | 3 |
| 3 | 26 | 10 | 2 | 3 | 2 | 3 |

TABLE 14-continued

| Interlace Index | Preamble Index | DMRS Port Index | Number of RBs Occupied by Frequency Domain Resource of PUSCH Resource | RB Index of Frequency Domain Resource of PUSCH Resource in Interlace Block | Number of Slots/ Mini-Slots Occupied by Time Domain Resource of PUSCH Resource | Offset of Position of Time Domain Resource of PUSCH Resource Relative to Time Domain Position of Preamble Sequence |
|---|---|---|---|---|---|---|
| 3 | 27 | 11 | 2 | 3 | 2 | 3 |
| 3 | 28 | 12 | 2 | 3 | 2 | 3 |
| 3 | 29 | 1 | 2 | 5 | 2 | 3 |
| 3 | 30 | 2 | 2 | 5 | 2 | 3 |
| 3 | 31 | 3 | 2 | 5 | 2 | 3 |
| 3 | 32 | 4 | 2 | 5 | 2 | 3 |
| 3 | 33 | 5 | 2 | 5 | 2 | 3 |
| 3 | 34 | 6 | 2 | 5 | 2 | 3 |
| 3 | 35 | 7 | 2 | 5 | 2 | 3 |
| 3 | 36 | 8 | 2 | 5 | 2 | 3 |
| 3 | 37 | 9 | 2 | 5 | 2 | 3 |
| 3 | 38 | 10 | 2 | 5 | 2 | 3 |
| 3 | 39 | 11 | 2 | 5 | 2 | 3 |
| 3 | 40 | 12 | 2 | 5 | 2 | 3 |
| 3 | 41 | 1 | 2 | 7 | 2 | 3 |
| 3 | 42 | 2 | 2 | 7 | 2 | 3 |
| 3 | 43 | 3 | 2 | 7 | 2 | 3 |
| 3 | 44 | 4 | 2 | 7 | 2 | 3 |
| 3 | 45 | 5 | 2 | 7 | 2 | 3 |
| 3 | 46 | 6 | 2 | 7 | 2 | 3 |
| 3 | 47 | 7 | 2 | 7 | 2 | 3 |
| 3 | 48 | 8 | 2 | 7 | 2 | 3 |
| 3 | 49 | 9 | 2 | 7 | 2 | 3 |
| 3 | 50 | 10 | 2 | 7 | 2 | 3 |
| 3 | 51 | 11 | 2 | 7 | 2 | 3 |
| 3 | 52 | 12 | 2 | 7 | 2 | 3 |
| 3 | 53 | 1 | 2 | 9 | 2 | 3 |
| 3 | 54 | 2 | 2 | 9 | 2 | 3 |
| 3 | 55 | 3 | 2 | 9 | 2 | 3 |
| 3 | 56 | 4 | 2 | 9 | 2 | 3 |
| 3 | 57 | 5 | 2 | 9 | 2 | 3 |
| 3 | 58 | 6 | 2 | 9 | 2 | 3 |
| 3 | 59 | 7 | 2 | 9 | 2 | 3 |
| 3 | 60 | 8 | 2 | 9 | 2 | 3 |
| 3 | 61 | 9 | 2 | 9 | 2 | 3 |
| 3 | 62 | 10 | 2 | 9 | 2 | 3 |
| 3 | 63 | 11 | 2 | 9 | 2 | 3 |
| 3 | 64 | 12 | 2 | 9 | 2 | 3 |

In the preceding table, as an exemplary demonstration, the interlace ID is the interlace index, and the preamble ID is the preamble index. In implementations of the present application, the interlace ID may also be the interlace group index or the sequence number of the interlace block in the interlace block group, and the preamble ID may also be the preamble group index or the sequence number of the preamble in the preamble group.

In an interlace-absent case where the number of DMRS ports can be divided by the number of preamble sequences without residual, mapping between the resource configuration of the PUSCH resource and the preamble sequence configuration information may be performed by using the preamble index. In an interlace-absent case where the number of DMRS ports cannot be divided by the number of preamble sequences without residual, mapping between the resource configuration of the PUSCH resource and the preamble sequence configuration information may be performed by jointly using an RO position or ID and the preamble index. Tables 15 and 16 describe the preceding two cases.

Table 15 describes an example of the mapping relationship between the resource configuration of the PUSCH resource and the preamble sequence configuration information in an interlace-absent case in embodiments of the present application.

The first column describes the preamble sequence configuration information: preamble index, and the last five columns describe the resource configuration of the PUSCH resource, including the DMRS port index, the frequency domain resource information of the PUSCH resource and the time domain resource information of the PUSCH resource. After determining the resource configuration of the PUSCH resource of the UE, the UE abides by the mapping relationship in Table 15 according to the resource configuration of the PUSCH resource and determines the corresponding preamble sequence configuration information; and then performs mapping of the preamble sequence according to the preamble sequence configuration information.

TABLE 15

| Preamble Index | DMRS Port Index | Number of RBs Occupied by Frequency Domain Resource of PUSCH Resource | Offset of Position of Frequency Domain Resource of PUSCH Resource Relative to Frequency Domain Position of Preamble Sequence | Number of Slots/Mini Slots Occupied by Time Domain Resource of PUSCH Resource | Offset of Position of Time Domain Resource of PUSCH Resource Relative to Time Domain Position of Preamble Sequence |
|---|---|---|---|---|---|
| 1 | 1 | 2 | 0 | 1 | 1 |
| 2 | 2 | 2 | 0 | 1 | 1 |
| 3 | 3 | 2 | 0 | 1 | 1 |
| 4 | 4 | 2 | 0 | 1 | 1 |
| 5 | 1 | 2 | 2 | 1 | 1 |
| 6 | 2 | 2 | 2 | 1 | 1 |
| 7 | 3 | 2 | 2 | 1 | 1 |
| 8 | 4 | 2 | 2 | 1 | 1 |
| 9 | 1 | 2 | 4 | 1 | 1 |
| 10 | 2 | 2 | 4 | 1 | 1 |
| 11 | 3 | 2 | 4 | 1 | 1 |
| 12 | 4 | 2 | 4 | 1 | 1 |
| 13 | 1 | 2 | 0 | 1 | 2 |
| 14 | 2 | 2 | 0 | 1 | 2 |
| 15 | 3 | 2 | 0 | 1 | 2 |
| 16 | 4 | 2 | 0 | 1 | 2 |
| 17 | 1 | 2 | 2 | 1 | 2 |
| 18 | 9 | 2 | 2 | 1 | 2 |
| 19 | 3 | 2 | 2 | 1 | 2 |
| 20 | 4 | 2 | 2 | 1 | 2 |
| 21 | 1 | 2 | 4 | 1 | 2 |
| 22 | 2 | 2 | 4 | 1 | 2 |
| 23 | 3 | 2 | 4 | 1 | 2 |
| 24 | 4 | 2 | 4 | 1 | 2 |
| 25 | 1 | 2 | 0 | 1 | 3 |
| 26 | 2 | 2 | 0 | 1 | 3 |
| 27 | 3 | 2 | 0 | 1 | 3 |
| 28 | 4 | 2 | 0 | 1 | 3 |
| 29 | 1 | 2 | 2 | 1 | 3 |
| 30 | 2 | 2 | 2 | 1 | 3 |
| 31 | 3 | 2 | 2 | 1 | 3 |
| 32 | 4 | 2 | 2 | 1 | 3 |
| 33 | 1 | 2 | 4 | 1 | 3 |
| 34 | 2 | 2 | 4 | 1 | 3 |
| 35 | 3 | 2 | 4 | 1 | 3 |
| 36 | 4 | 2 | 4 | 1 | 3 |
| 37 | 1 | 3 | 0 | 1 | 4 |
| 38 | 2 | 3 | 0 | 1 | 4 |
| 39 | 3 | 3 | 0 | 1 | 4 |
| 40 | 4 | 3 | 0 | 1 | 4 |
| 41 | 1 | 3 | 3 | 1 | 4 |
| 42 | 2 | 3 | 3 | 1 | 4 |
| 43 | 3 | 3 | 3 | 1 | 4 |
| 44 | 4 | 3 | 3 | 1 | 4 |
| 45 | 1 | 3 | 0 | 1 | 5 |
| 46 | 2 | 3 | 0 | 1 | 5 |
| 47 | 3 | 3 | 0 | 1 | 5 |
| 48 | 4 | 3 | 0 | 1 | 5 |
| 49 | 1 | 3 | 3 | 1 | 5 |
| 50 | 2 | 3 | 3 | 1 | 5 |
| 51 | 3 | 3 | 3 | 1 | 5 |
| 52 | 4 | 3 | 3 | 1 | 5 |
| 53 | 1 | 3 | 6 | 2 | 7 |
| 54 | 2 | 3 | 6 | 2 | 7 |
| 55 | 3 | 3 | 6 | 2 | 7 |
| 56 | 4 | 3 | 6 | 2 | 7 |
| 57 | 1 | 3 | 0 | 1 | 9 |
| 58 | 2 | 3 | 0 | 1 | 9 |
| 59 | 3 | 3 | 0 | 1 | 9 |
| 60 | 4 | 3 | 0 | 1 | 9 |
| 61 | 1 | 1 | 3 | 1 | 10 |
| 62 | 2 | 1 | 3 | 1 | 10 |
| 63 | 3 | 1 | 3 | 1 | 10 |
| 64 | 4 | 1 | 3 | 1 | 10 |

In the preceding table, one value of the sixth column "Offset of Position of Time Domain Resource of PUSCH Resource Relative to Time Domain Position of Preamble Sequence" is one possible implementation. In implementations of the present application, the numbers in the sixth column of Table 15 may be other values. That is, the number 1 in the sixth column of Table 15 may be replaced by t1, the number 2 in the sixth column of Table 15 may be replaced by t2, . . . , and the number 6 in the sixth column of Table 15 may be replaced by t6. t1, t2, t3, t4, t5 and t6 each are integers.

Table 16 describes an example of the mapping relationship between the resource configuration of the PUSCH resource and the preamble sequence configuration information in an interlace-absent case in embodiments of the present application.

Figure 2:
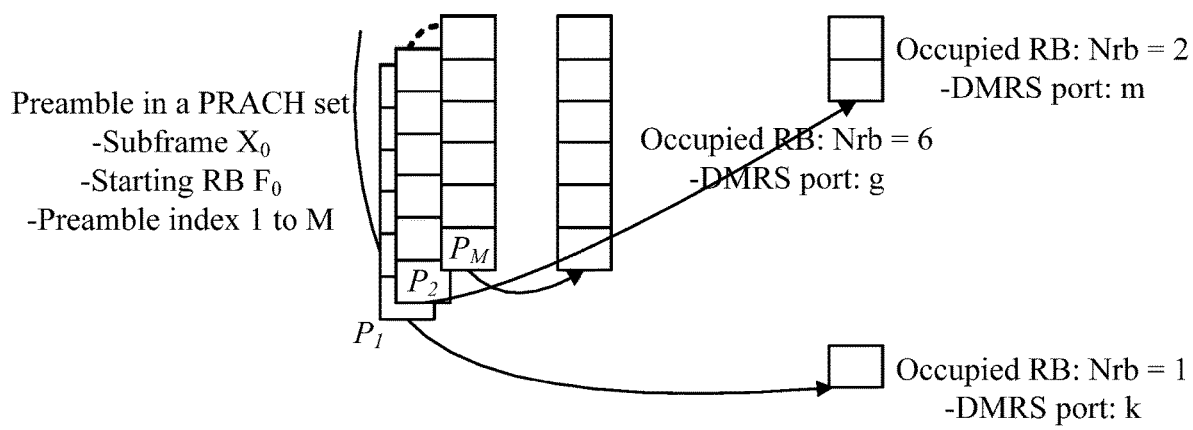
FIG. 2 is a schematic diagram of a mapping manner in which a RACH Occasion (RO) contains M preamble sequences according to embodiments of the present application.

The first column and the second column describe the preamble sequence configuration information: RO ID and preamble index, and the last five columns describe the resource configuration of the PUSCH resource, including the DMRS port index, the frequency domain resource information of the PUSCH resource and the time domain resource information of the PUSCH resource. After determining the resource configuration of the PUSCH resource of the UE, the UE abides by the mapping relationship in Table 16 according to the resource configuration of the PUSCH resource and determines the corresponding preamble sequence configuration information; and then performs mapping of the preamble sequence according to the preamble sequence configuration information.

embodiments of the present application. In FIG. 2, the RO contains M preamble sequences. P1, P2, . . . and PM. P1, P2, . . . and PM are mapped onto different positions. P1 occupies one RB and corresponds to the DMRS port index k. P2 occupies two RBs and corresponds to the DMRS port index m. P3 occupies six RBs and corresponds to the DMRS port index g.

In the mapping relationship described in each of the preceding tables, the position of the frequency domain resource of the PUSCH resource includes at least one of the RB index of the start point of the PUSCH frequency domain resource or the interlace index of PUSCH; the position of the time domain resource of the PUSCH resource includes at least one of the system frame number (SFN) of the start point of the time domain resource of the PUSCH resource, the subframe number of the start point of the time domain resource of the PUSCH resource, the slot position or mini-slot position of the start point of the time domain resource of the PUSCH resource, or the start symbol of PUSCH. The preceding describes various forms of mapping between the resource configuration of the PUSCH resource and the preamble sequence configuration information. Mappings in

TABLE 16

| RO ID | Preamble Index | DMRS Port Index | Number of RBs Occupied by Frequency Domain Resource of PUSCH Resource | Offset of Position of Frequency Domain Resource of PUSCH Resource Relative to Frequency Domain Position of Preamble Sequence | Number of Slots/ Mini Slots Occupied by Time Domain Resource of PUSCH Resource | Offset of Position of Time Domain Resource of PUSCH Resource Relative to Time Domain Position of Preamble Sequence |
|---|---|---|---|---|---|---|
| 1 | 1 | 1 | 2 | 0 | 1 | 1 |
| 1 | 2 | 2 | 2 | 0 | 1 | 1 |
| 1 | 3 | 3 | 2 | 0 | 1 | 1 |
| 1 | 4 | 4 | 2 | 0 | 1 | 1 |
| 1 | 5 | 1 | 2 | 2 | 1 | 1 |
| 1 | 6 | 2 | 2 | 2 | 1 | 1 |
| 1 | 7 | 3 | 2 | 2 | 1 | 1 |
| 1 | 8 | 4 | 2 | 2 | 1 | 1 |
| 1 | 9 | 1 | 2 | 4 | 1 | 1 |
| 1 | 10 | 2 | 2 | 4 | 1 | 1 |
| 1 | 11 | 3 | 2 | 4 | 1 | 1 |
| 1 | 12 | 4 | 2 | 4 | 1 | 1 |
| 1 | 13 | 1 | 2 | 0 | 1 | 2 |
| 2 | X (for example, X = 1) | 2 | 2 | 0 | 1 | 2 |
| 2 | Y (for example, Y = 2) | 3 | 2 | 0 | 1 | 2 |
| 2 | Z (for example, Z = 3) | 4 | 2 | 0 | 1 | 2 |

In the preceding table, one value of the seventh column "Offset of Position of Time Domain Resource of PUSCH Resource Relative to Time Domain Position of Preamble Sequence" is one possible implementation. In implementations of the present application, the numbers in the seventh column of Table 16 may be other values. That is, the number 1 in the seventh column of Table 16 may be replaced by t1, and the number 2 in the seventh column of Table 16 may be replaced by t2. t1 and t2 are both integers. The preceding table describes an example in which one RO contains 13 available preamble sequences. In the preceding table, the resource configuration of the PUSCH resource is jointly indicated by all available preamble sequences of one RO, any three preamble sequences of the second RO, and the preamble index.

FIG. 2 is a schematic diagram of a mapping manner in which an RO contains M preamble sequences according to implementations of the present application are not limited to these forms. It is to be noted that in each of the preceding tables, "Number of RBs Occupied by Frequency Domain Resource of PUSCH Resource" and "Number of Slots/Mini-Slots Occupied by Time Domain Resource of PUSCH Resource" may refer to the resource configuration granularity of the PUSCH resource, and the time-frequency resource occupied by the user may be a multiple of this granularity.

According to the preceding mapping relationships, the UE can determine the preamble sequence configuration information corresponding to the resource configuration of the PUSCH resource of the UE to select the transmission resource.

Figure 3:
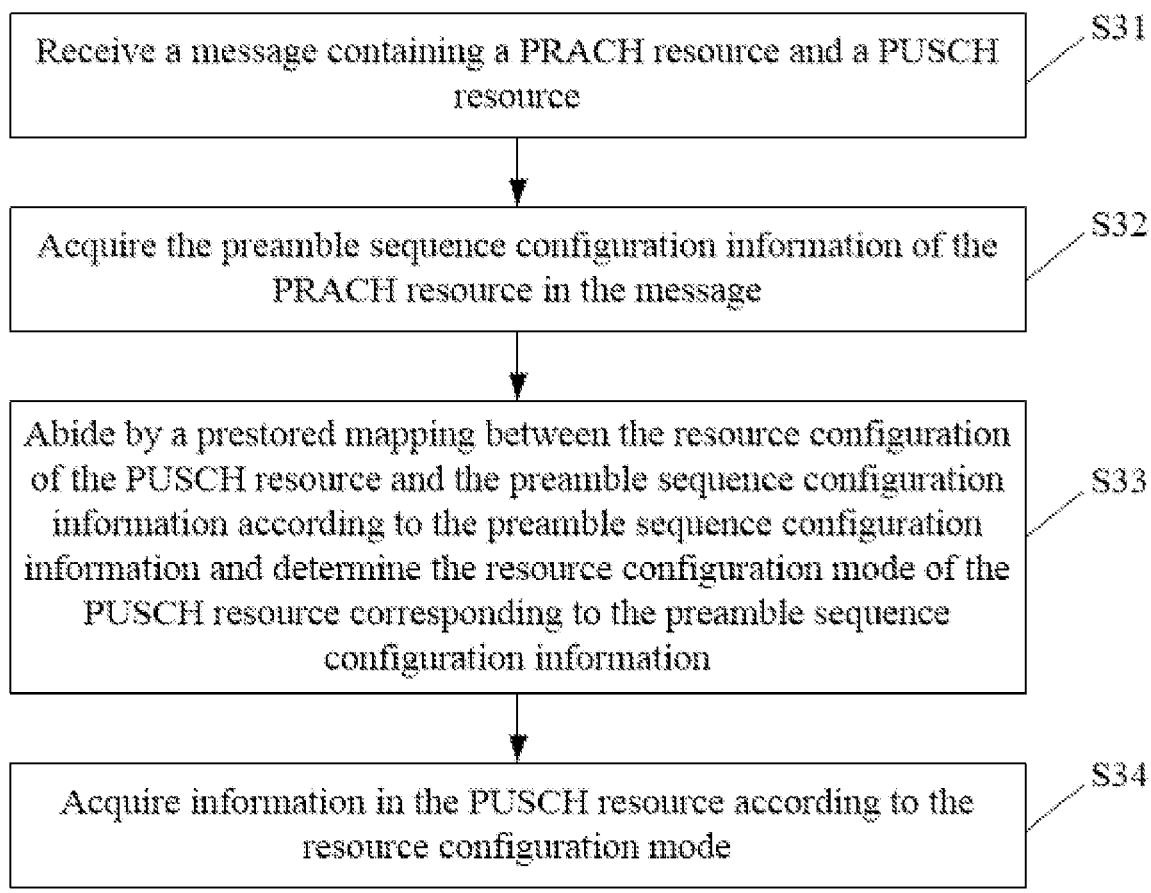
FIG. 3 is a flowchart of implementing a data transmission method according to embodiments of the present application.

Accordingly, the base station can also simplify a reception and demodulation process by using the preceding mapping relationship. FIG. 3 is a flowchart of implementing a data transmission method according to embodiments of the present application. The method includes the steps described hereinafter.

In S31, a message containing a PRACH resource and a PUSCH resource is received.

In S32, the preamble sequence configuration information of the PRACH resource in the message is acquired.

In S33, a prestored mapping relationship between the resource configuration of the PUSCH resource and the preamble sequence configuration information is abide by according to the preamble sequence configuration information, and the resource configuration mode of the PUSCH resource corresponding to the preamble sequence configuration information is determined.

In S34, information in the PUSCH resource is acquired according to the resource configuration mode.

In one implementation, the information in the PUSCH resource includes at least one of a UE ID or user plane data. The preceding message may be a random access message or a data packet message.

The method of this embodiment of the present application can be applied to a base station. Before step S31, the method may further include sending the mapping relationship between the resource configuration of the PUSCH resource and the preamble sequence configuration information to a UE to enable the UE to send the message according to the resource configuration of the PUSCH resource of the UE and the mapping relationship.

The mapping relationship between the resource configuration of the PUSCH resource and the preamble sequence configuration information has been described in the preceding embodiments. The details are not repeated here.

Figure 4:
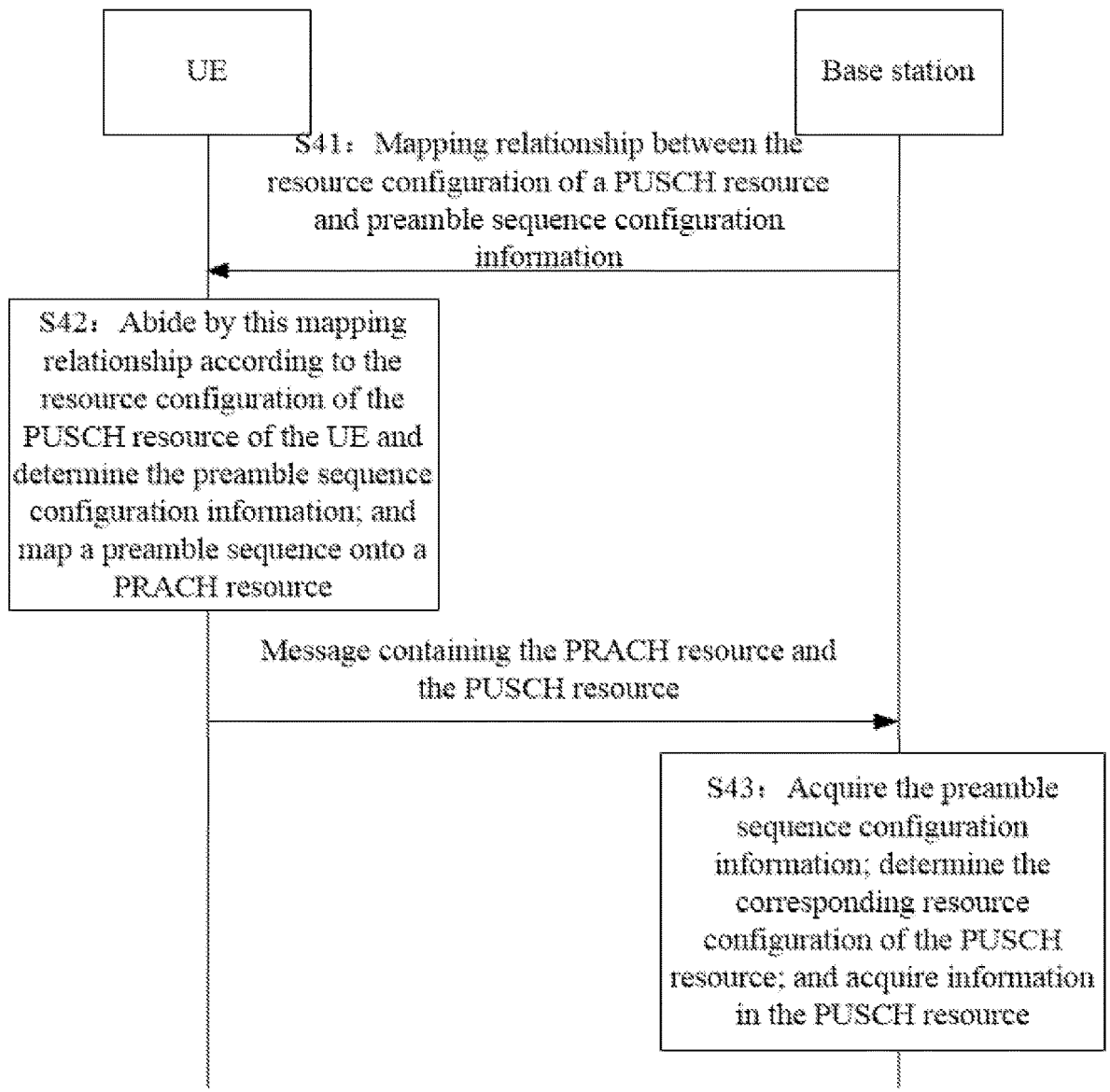
FIG. 4 is a flowchart illustrating a process of interaction between a base station and a UE according to embodiments of the present application.

FIG. 4 is a flowchart illustrating a process of interaction between a base station and a UE according to embodiments of the present application. The process of interaction includes the steps described hereinafter.

In S41, the base station sends a mapping relationship between the resource configuration of a PUSCH resource and preamble sequence configuration information to the UE.

In S42, the UE abides by the mapping relationship according to the resource configuration of the PUSCH resource and determines the corresponding preamble sequence configuration information; maps a preamble sequence onto a PRACH resource according to the preamble sequence configuration information; and sends a message containing the PRACH resource and the PUSCH resource to the base station.

In S43, the base station receives the message and acquires the preamble sequence configuration information of the PRACH resource in the message; abides by the prestored mapping relationship between the resource configuration of the PUSCH resource and the preamble sequence configuration information according to the preamble sequence configuration information and determines the resource configuration mode of the PUSCH resource corresponding to the preamble sequence configuration information; and acquires information in the PUSCH resource according to the resource configuration mode.

Figure 5:
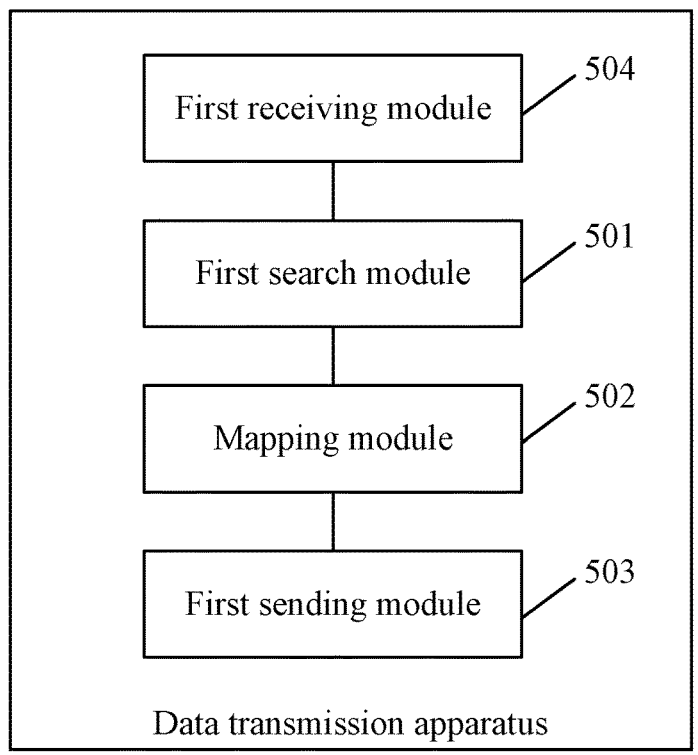
FIG. 5 is a schematic diagram illustrating a structure of a data transmission apparatus according to embodiments of the present application.

Embodiments of the present application provide a data transmission apparatus. FIG. 5 is a schematic diagram illustrating a structure of a data transmission apparatus according to embodiments of the present application. The apparatus includes a first search module 501 configured to abide by a mapping relationship between the resource configuration of a PUSCH resource and preamble sequence configuration information according to the resource configuration of the PUSCH resource and determine preamble sequence configuration information corresponding to the resource configuration of the PUSCH resource; a mapping module 502 configured to map a preamble sequence onto a PRACH resource according to the preamble sequence configuration information; and a first sending module 503 configured to send a message containing the PRACH resource and the PUSCH resource.

In the preceding implementation, information in the PUSCH resource includes at least one of a UE ID or user plane data.

In one implementation, the apparatus may further include a first receiving module 504 configured to receive the mapping relationship between the resource configuration of the PUSCH resource and the preamble sequence configuration information, where the mapping relationship is sent by a base station.

This embodiment can be applied to a UE. The mapping relationship between the resource configuration of the PUSCH resource and the preamble sequence configuration information in this embodiment is the same as that described in the preceding embodiments. The details are not repeated here.

Figure 6:
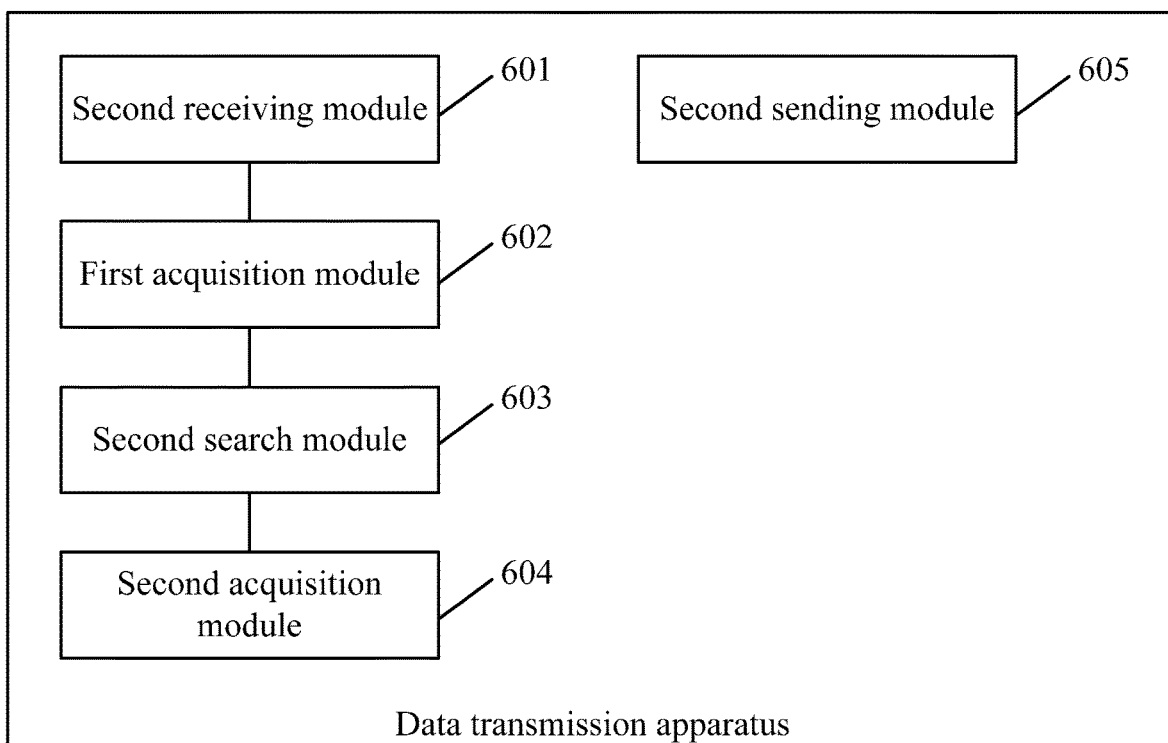
FIG. 6 is a schematic diagram illustrating a structure of a data transmission apparatus according to embodiments of the present application.

Embodiments of the present application provide a data transmission apparatus. FIG. 6 is a schematic diagram illustrating a structure of a data transmission apparatus according to embodiments of the present application. The apparatus includes a second receiving module 601 configured to receive a message containing a PRACH resource and a PUSCH resource; a first acquisition module 602 configured to acquire the preamble sequence configuration information of the PRACH resource in the message; a second search module 603 configured to abide by a prestored mapping relationship between the resource configuration of the PUSCH resource and the preamble sequence configuration information according to the preamble sequence configuration information and determine the resource configuration mode of the PUSCH resource corresponding to the preamble sequence configuration information; and a second acquisition module 604 configured to acquire information in the PUSCH resource according to the resource configuration mode.

In one implementation, the information in the PUSCH resource includes at least one of a UE ID or user plane data.

In one implementation, the apparatus may further include a second sending module 605 configured to send the association rules between the resource configuration of the PUSCH resource and the preamble sequence configuration information to a UE to enable the UE to send the message according to the resource configuration of the PUSCH resource of the UE and the mapping relationship including the association rules This embodiment can be applied to a base station. The mapping relationship including the association rules between the resource configuration of the PUSCH resource and the preamble sequence configuration information in this embodiment is the same as that described in the preceding embodiments. The details are not repeated here.

For details about functions of modules of apparatuses in embodiments of the present application, reference may be made to the corresponding description in the preceding method embodiments. The details are not repeated here.

Figure 7:
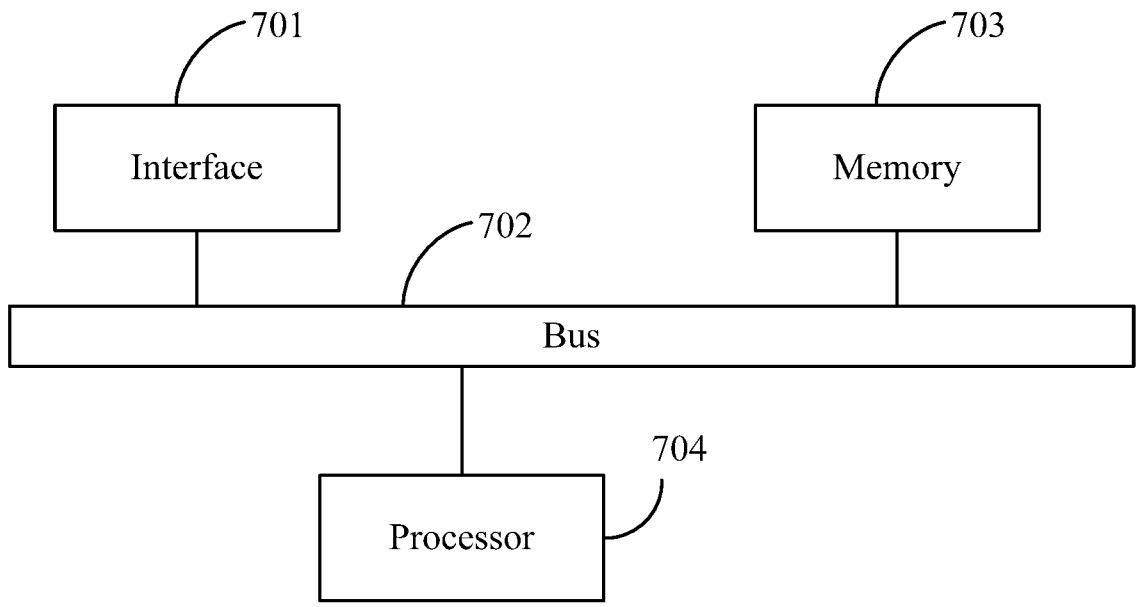
FIG. 7 is a schematic diagram illustrating a structure of a UE for data transmission according to embodiments of the present application.

FIG. 7 is a schematic diagram illustrating a structure of a UE for data transmission according to embodiments of the present application. As shown in FIG. 7, the UE 70 of embodiments of the present application includes a memory 703 and a processor 704. The UE 70 may further include an interface 701 and a bus 702. The interface 701 and the memory 703 are connected to the processor 704 through the bus 702. The memory 703 is configured to store instructions. The processor 704 is configured to read the instructions to execute the technical solution of the preceding method embodiments applied to the UE. The implementation principles and technical effects are similar. The details are not repeated here.

Figure 8:
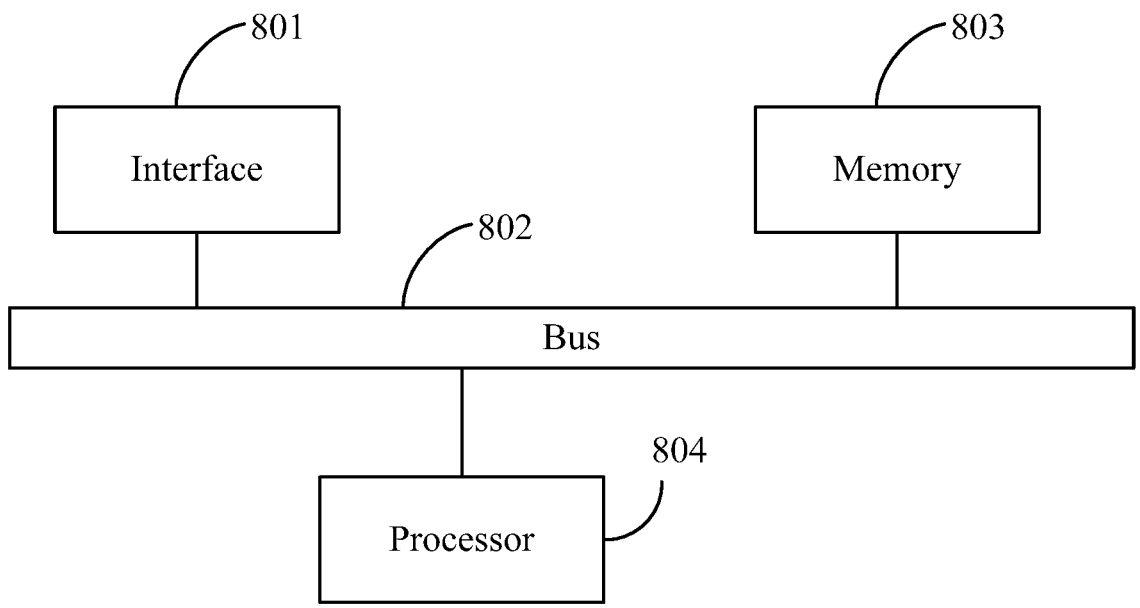
FIG. 8 is a schematic diagram illustrating a structure of a base station for data transmission according to embodiments of the present application.

FIG. 8 is a schematic diagram illustrating a structure of a base station for data transmission according to embodiments of the present application. As shown in FIG. 8, the base station 80 of embodiments of the present application includes a memory 803 and a processor 804. The base station 80 may further include an interface 801 and a bus 802. The interface 801 and the memory 803 are connected to the processor 804 through the bus 802. The memory 803 is configured to store instructions. The processor 804 is configured to read the instructions to execute the technical solution of the preceding method embodiments applied to the base station. The implementation principles and technical effects are similar. The details are not repeated here.

Figure 9:
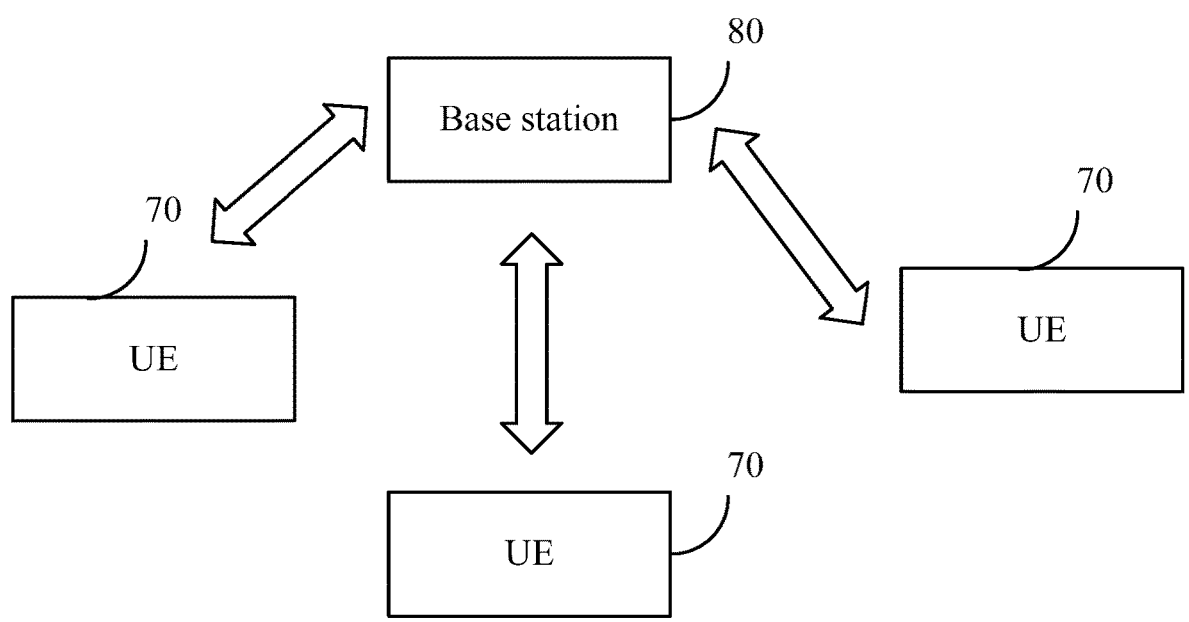
FIG. 9 is a schematic diagram illustrating a structure of a communication system according to embodiments of the present application.

FIG. 9 is a schematic diagram illustrating a structure of a communication system according to embodiments of the present application. As shown in FIG. 9, the system includes the UE 70 and the base station 80 of the preceding embodiments.

The present application provides a storage medium. The storage medium stores a computer program. When executed by a processor the computer program causes the processor to perform any method of the preceding embodiments.

It is to be understood by those skilled in the art that embodiments of the present application may be provided as methods, systems or computer program products. Therefore, the present application may take the form of a hardware embodiment, a software embodiment, or an embodiment combining software and hardware. Moreover, the present application may take the form of a computer program product implemented in one or more computer-usable storage media (including, but not limited to, a disk memory and an optical memory) that contain computer-usable program codes.

The present application is described with reference to flowcharts and/or block diagrams of methods, apparatus (systems) and computer program products according to embodiments of the present disclosure. It is to be understood that each flow and/or block in the flowcharts and/or block diagrams and a combination of flows and/or blocks in the flowcharts and/or block diagrams may be implemented using computer program instructions. These computer program instructions may be provided for a processor of a general-purpose computer, special-purpose computer, embedded processor or another programmable data processing device to produce a machine so as to enable the instructions executed by the processor of the computer or another programmable data processing device to generate an apparatus for implementing the functions specified in one or more flows in the flowcharts and/or one or more blocks in the block diagrams.

These computer program instructions may also be stored in a computer-readable memory that can direct a computer or another programmable data processing device to operate in a particular manner, so that the instructions stored in the computer-readable memory produce an article of manufacture including an instruction apparatus. The instruction apparatus implements the functions specified in one or more flows in the flowcharts and/or one or more blocks in the block diagrams.

These computer program instructions may also be loaded onto a computer or another programmable data processing device so that a series of operating steps are performed on the computer or another programmable device, and thereby the instructions executed on the computer or another programmable device provide steps for implementing the functions specified in one or more flows in the flowcharts and/or one or more blocks in the block diagrams.

The preceding are merely optional embodiments of the present application and are not intended to limit the scope of the present application.

What is claimed is:

1. A data transmission method, comprising:
obtaining a mapping relationship between a plurality of physical uplink shared channel (PUSCH) resource configurations and a plurality of random-access preamble sequence configurations from a base station;
determining, for a random-access preamble transmission and PUSCH transmission, a PUSCH resource configuration among the plurality of PUSCH resource configurations for the PUSCH transmission based on a payload size range of the PUSCH transmission, and a random-access preamble group index among a plurality of random-access preamble group indexes for indicating a random-access preamble sequence configuration among the plurality of random-access preamble sequence configurations based on the mapping relationship and the PUSCH resource configuration such that the random-access preamble group index is determined among the plurality of random-access preamble group indexes according the payload size range of the PUSCH transmission, wherein different PUSCH payload size ranges correspond to different random-access preamble group indexes;
mapping a random-access preamble sequence among random-access preamble sequences associated with the random-access preamble group index onto a physical random-access channel (PRACH) resource; and
sending a message over the PRACH resource and sending the PUSCH transmission.

2. The method of claim 1, wherein the PUSCH resource configuration comprises the payload size range of the PUSCH transmission.

3. A non-transitory storage medium, the storage medium storing a computer program, which, when executed by a processor, causes the processor to perform the method of claim 1.

4. The non-transitory storage medium of claim 3, wherein the PUSCH resource configuration comprises the payload size of the PUSCH.

5. A data transmission method, comprising:
sending a mapping relationship between a plurality of physical uplink shared channel (PUSCH) resource configurations and a plurality of random-access preamble sequence configurations to a UE;
receiving a random-access preamble over a physical random-access channel (PRACH) resource from the UE;
acquiring a random-access preamble sequence configuration of the PRACH resource from the random-access preamble, wherein the random-access preamble sequence configuration indicates a random-access preamble group index, the random-access preamble group index further indicating, based on the mapping relationship, a PUSCH resource configuration among the plurality of PUSCH resource configurations for a PUSCH transmission associated with the random-access preamble, the random-access preamble group index further indicating a payload size range of the PUSCH transmission, wherein different PUSCH payload size ranges correspond to different random-access preamble group indexes; and receiving the PUSCH transmission according to the PUSCH resource configuration.

6. The method of claim 5, wherein the PUSCH resource configuration comprises the payload size range of the PUSCH transmission.

7. A base station (BS) for data transmission, comprising a processor and a memory, wherein the memory is configured to store instructions and the processor is configured to read the instructions to perform the method of claim 5.

8. The BS of claim 7, wherein the PUSCH resource configuration comprises the payload size range of the PUSCH transmission.

9. A non-transitory storage medium, the storage medium storing a computer program, which, when executed by a processor, causes the processor to perform the method of claim 5.

10. The non-transitory storage medium of claim 9, wherein the PUSCH resource configuration comprises the payload size range of the PUSCH transmission.

11. A user equipment (UE) for data transmission, comprising a processor and a memory, wherein:

the memory is configured to store instructions; and the processor is configured to read the instructions to perform:

obtaining a mapping relationship between a plurality of physical uplink shared channel (PUSCH) resource configurations and a plurality of random-access preamble sequence configurations from a base station;

determining, for a random-access preamble and PUSCH transmission, a PUSCH resource configuration among the plurality of PUSCH resource configurations for the PUSCH transmission based on a payload size range of the PUSCH transmission, and a random-access preamble group index among a plurality of random-access preamble group indexes for indicating a random-access preamble sequence configuration among the plurality of random-access preamble sequence configurations based on the mapping relationship and PUSCH resource configuration such that the random-access preamble group index is determined among the plurality of random-access preamble group indexes according the payload size range of the PUSCH transmission, wherein different PUSCH payload size ranges correspond to different random-access preamble group indexes;

mapping a random-access preamble sequence among random-access preamble sequences associated with the random-access preamble group index onto a physical random-access channel (PRACH) resource; and sending a message over the PRACH resource and sending the PUSCH transmission.

12. The UE of claim 11, wherein PUSCH resource configuration comprises the payload size range of the PUSCH transmission.

* * * * *